United States Patent [19]

St. John et al.

[11] E Patent Number: Re. 32,967

[45] Reissued Date of Patent: Jun. 27, 1989

[54] WEB TRACKING SYSTEM

[75] Inventors: Robert P. St. John, Cupertino; William A. Lloyd, Los Altos, both of Calif.

[73] Assignee: Xerox Corporation, Stamford, Conn.

[21] Appl. No.: 934,586

[22] Filed: Nov. 25, 1986

Related U.S. Patent Documents

Reissue of:

[64] Patent No.: 4,485,982
Issued: Dec. 4, 1984
Appl. No.: 444,143
Filed: Nov. 24, 1982

[51] Int. Cl.[4] ..... B65H 25/26

[52] U.S. Cl. ..... 242/57.1; 226/15; 226/10; 226/20; 250/557; 250/560

[58] Field of Search ..... 242/57.1, 75.51, 75.52; 226/2, 3, 10, 15, 16, 18–21, 24, 30, 40, 45; 250/548, 557, 560, 561; 346/70, 136; 355/4, 8, 77, 88; 101/151, 152, 181, 248, DIG. 13; 364/469

[56] References Cited

U.S. PATENT DOCUMENTS

| | | | |
|---|---|---|---|
| 2,105,185 | 1/1938 | Degnan | 101/181 |
| 2,105,185 | 1/1938 | Degnan | 101/181 |
| 2,151,570 | 3/1939 | Shoults et al. | 271/26 |
| 2,230,715 | 2/1941 | Cockrell | 271/2.6 |
| 2,250,209 | 7/1941 | Shoults et al. | 271/2.6 |
| 2,278,933 | 4/1943 | Kott | 177/311 |
| 2,278,933 | 4/1942 | Kott | 177/311 |
| 2,289,737 | 7/1942 | Sorkin | 177/311 |
| 2,289,737 | 7/1942 | Sorkin | 177/311 |
| 2,566,399 | 9/1951 | Bishop | 101/248 |
| 2,768,827 | 10/1956 | Noble | 271/2.6 |
| 2,802,666 | 8/1957 | Crosfield | 226/16 |
| 2,840,370 | 6/1958 | Noble | 271/2.6 |
| 2,840,721 | 6/1958 | Frommer | 242/57.1 X |
| 2,866,407 | 12/1958 | Hackel et al. | 101/181 |
| 2,888,260 | 5/1959 | Schowerer et al. | 226/10 |
| 3,027,462 | 3/1962 | Helems | 250/219 |
| 3,033,109 | 5/1962 | Frommer | 101/181 |
| 3,068,787 | 12/1962 | Dall'oglio et al. | 101/181 |
| 3,084,621 | 4/1963 | Guastavino | 101/181 |
| 3,097,844 | 7/1963 | Huck | 270/52 |
| 3,165,056 | 1/1965 | Heatley, Jr. et al. | 101/181 |
| 3,278,939 | 10/1966 | Morton | 226/10 X |
| 3,280,737 | 10/1966 | Huck | 101/181 |
| 3,366,876 | 1/1968 | Kurth et al. | 242/57.1 X |
| 3,446,978 | 5/1969 | Leavens | 250/219 |
| 3,525,872 | 8/1970 | Schneider | 250/548 |
| 3,559,568 | 2/1971 | Stanley | 101/32 |
| 3,594,552 | 7/1971 | Adamson | 235/92 MP |
| 3,701,464 | 10/1972 | Crum | 226/3 |
| 3,711,353 | 1/1973 | Zimmer | 156/267 |
| 3,781,490 | 12/1973 | Phillips | 242/75.51 X |
| 3,880,076 | 4/1975 | Black et al. | 101/115 |
| 3,915,090 | 10/1975 | Horst et al. | 101/426 |
| 3,919,560 | 11/1975 | Nopper | 250/557 |
| 4,007,489 | 2/1977 | Helmberger et al. | 358/78 |
| 4,025,025 | 5/1977 | Bartel et al. | 226/33 |
| 4,129,238 | 12/1978 | Herd | 226/29 |
| 4,264,957 | 4/1981 | Pautzke | 364/469 |
| 4,286,031 | 8/1981 | Kuehnle et al. | 430/44 |
| 4,361,260 | 11/1930 | Hanlan | 226/30 |
| 4,363,271 | 12/1982 | Horst | 101/181 |
| 4,364,502 | 12/1982 | Frentress | 226/15 X |
| 4,401,024 | 8/1983 | Frentress | 101/93.01 |
| 4,482,972 | 11/1913 | Lewis et al. | 364/561 |
| 4,528,630 | 7/1985 | Sargent | 364/469 |

FOREIGN PATENT DOCUMENTS

| | | | |
|---|---|---|---|
| 2658659 | 6/1978 | Fed. Rep. of Germany . | |
| 57-114158 | 7/1982 | Japan . | |
| 57-122455 | 7/1982 | Japan . | |
| 57-124753 | 8/1982 | Japan . | |
| 167034 | 10/1982 | Japan | 355/4 |
| 1463197 | 2/1977 | United Kingdom . | |
| 2022018 | 12/1979 | United Kingdom . | |

*Primary Examiner*—John M. Jillions

*Attorney, Agent, or Firm*—W. Douglas Carothers, Jr.

[57] ABSTRACT

A web tracking system for a continuous web of material which is transported from a supply to a takeup means along a predetermined path via one or more processing stations and comprises aligned tracking indicia along at least one edge of the web. Means are provided to observe the tracking indica as the web is transported along the system path and produce information either indicative of dimensional changes in the length and width of the web due to web shrinkage or expansion or indicative of a particular point along the length of the web useful at one or more of the processing stations in the system.

77 Claims, 16 Drawing Sheets

WEB TRACKING SYSTEM

Matter enclosed in heavy brackets [ ] appears in the original patent but forms no part of this reissue specification; matter printed in italics indicates the additions made by reissue.

RELATED APPLICATION

U.S. Application Ser. No. 444,144, filed Nov. 24, 1982 and entitled COLOR ELECTROGRAPHIC RECORDING APPARATUS and assigned to the assignee herein.

BACKGROUND OF THE INVENTION

The present invention relates to the transport of a continuous web of material and more particularly to a system and method for tracking of the web in its path of movement from a supply to a takeup means.

Many different kinds of systems have been devised to track the movement of a web of material in order to positively determine, for example, various locations along its length so that one or more operations may be performed in connection with the treatment of the web. In carrying out the treatment, the path of the web may have to be monitored to ensure that it [mantains] *maintains* a predetermined path in the system for processing at one or more system stations. This may entail optical monitoring means and lateral translation of the web in the system path or lateral translation of the web supply roll to provide for misalignment correction.

Also, the web may change in physical size, i.e., it will stretch or expand, or shrink or contract both laterally and longitudinally relative to its length. Such expansion or shrinkage is due to several factors. The major factors are environmental conditions, e.g., temperature and humidity, web handling in the system and the resultant action of the particular processes being performed in connection with the web, e.g., the application of a fluid to the surface of the web.

In the usual case of web material, e.g., electrographic recording medium comprising dielectric coated paper, the web can stretch or shrink as much as 1 mil per foot and the dimensional change laterally across this type of material can be three times greater than the dimensional change along the longitudinal extent of the material. Web material is acceptable to such dimensional changes due to the manner by which it is made. For example, in the case of paper, the fiberous grain of the paper is such that it can stretch or shrink more in one orthogonal direction as compared to another. Web material such as polyester based films may not stretch or shrink as much as paper, but are still succeptable to some stretching and shrinkage.

Further, web material may neither be perfectly flat or straight nor are the web material edges exactly parallel to one another.

These web dimensional changes and physical irregularities which may occur while the web material is moving through a web processing system can contribute significantly to the successful application of the desired process.

While one solution to this problem might be to require tighter specifications in the design and manufacture of web material without these irregularities, this would not be desirable because of the high costs to provide such quality control in its manufacture, which would not be acceptable to web material manufacturers.

The better approach is to create a tracking system that can cope with these irregularities and capable of monitoring and controlling the station functions without requiring changes to the web material.

SUMMARY OF THE INVENTION

According to this invention, a system and method is provided for monitoring tracking indica provided on the web material, preferrably along one or more of its edges, and developing signals representative of web dimensional changes for application at one or more web processing stations taking into account the changes in web physical parameters.

The web tracking system of this invention is for a continuous web of material which is transported from a supply to a takeup means along a predetermined path via one or more processing stations comprising aligned tracking [indica] *indicia* along at least one edge of the web. Means is provided to observe the tracking [indica] *indicia* as the web is transported along the system path and produce information indicative of dimensional changes in the length of the web or indicative of a particular point along the length of the web, which information is useful at one or more of the processing stations. The aforementioned means includes optical sensing of the tracking [indica] *indicia* provide electrical signals representative of the tracking indicia.

Means associated with the transport of the web photoelectrically senses the aligned tracking indicia and provides electrical signals representative of information as to the dimensional extent both laterally and longitudinally of the web being handled by the system and useful, for example, to provide adjustment for both lateral and longitudinal dimension of the web through the operation of a stepper motor via a position control that processes and interprets the electrical signals representative of the indicia.

One aspect of the associated means is to provide relative translation between the web and a processing station on-the-fly as the web is being processed at the station. This may be possibly exemplified in several ways. First, the supply roll from which the web is paid out into the system may be laterally translated relative to the web path through the system and the system work stations. Secondly, a processing station may be laterally translated relative to the web. Third, the processing station or component at the station may be rotated relative to the path of the web through the system.

Another aspect of the associated mean is to control the rate of movement of the web along its path based upon the sensed information relative to the tracking indicia.

The tracking indicia may comprise an aligned series of registration marks having the same dimensional spacing and width adjacent one edge or adjacent both edges of the web. The registration marks may be preceeded by a plurality of aligned initializing marks for which have a different geometric shape compared to the registration marks, e.g., a different mark width. The point of change from the last narrower initializing mark to the first wider registration mark can be indicative of the starting point on the web for a particular treatment to be applied at a selected processing station.

Lateral and longitudinal dimensional changes in the web drived from observation of an aligned row of registration marks is indicative of changes in length, either expansion or shrinkage, of the web under observation.

In this regard, it should be noted that coarse correction for lateral alignment of the web relative to a processing station due to web shifting in the system path can be accomplished by the lateral translation of the web supply roll while fine correction for lateral *alignment* due to web expansion or shrinkage can be accomplished by the lateral translation of a processing station or a component at the station to recenter the station relative to the web.

Alternatively, a tracking line adjacent to and parallel with the aligned row of registration marks at both edges of the web may be employed for lateral station translation.

Other objects and attainments together with a fuller understanding of the invention will become apparent and appreciated by referring to the following description and claims taken in conjunction with the accompanying drawings.

DETAILED DESCRIPTION OF PREFERRED EMBODIMENT

Figure 1:
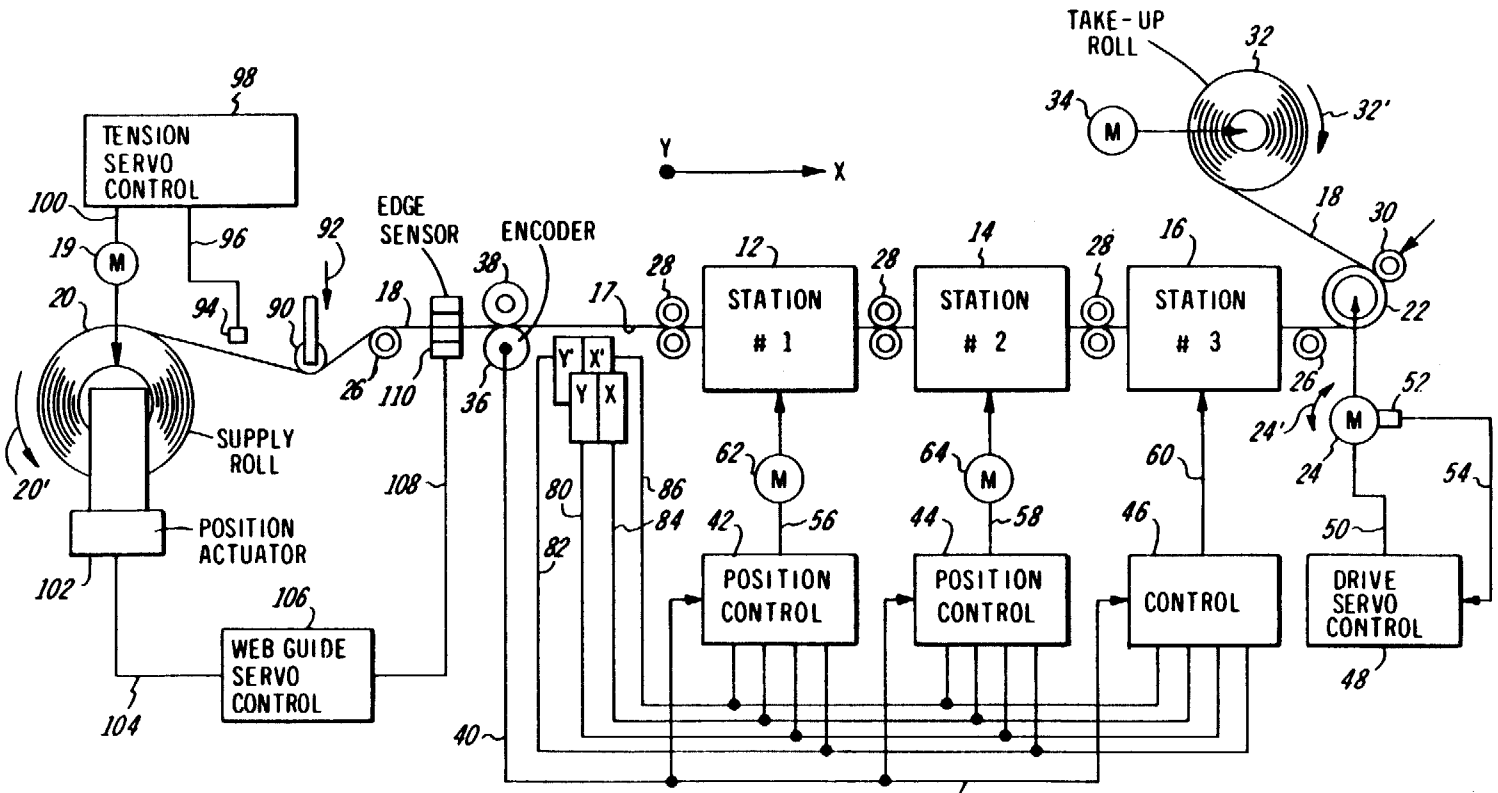
FIG. 1 is a schematic diagram showing a web tracking system according to this invention.
Figure 2:
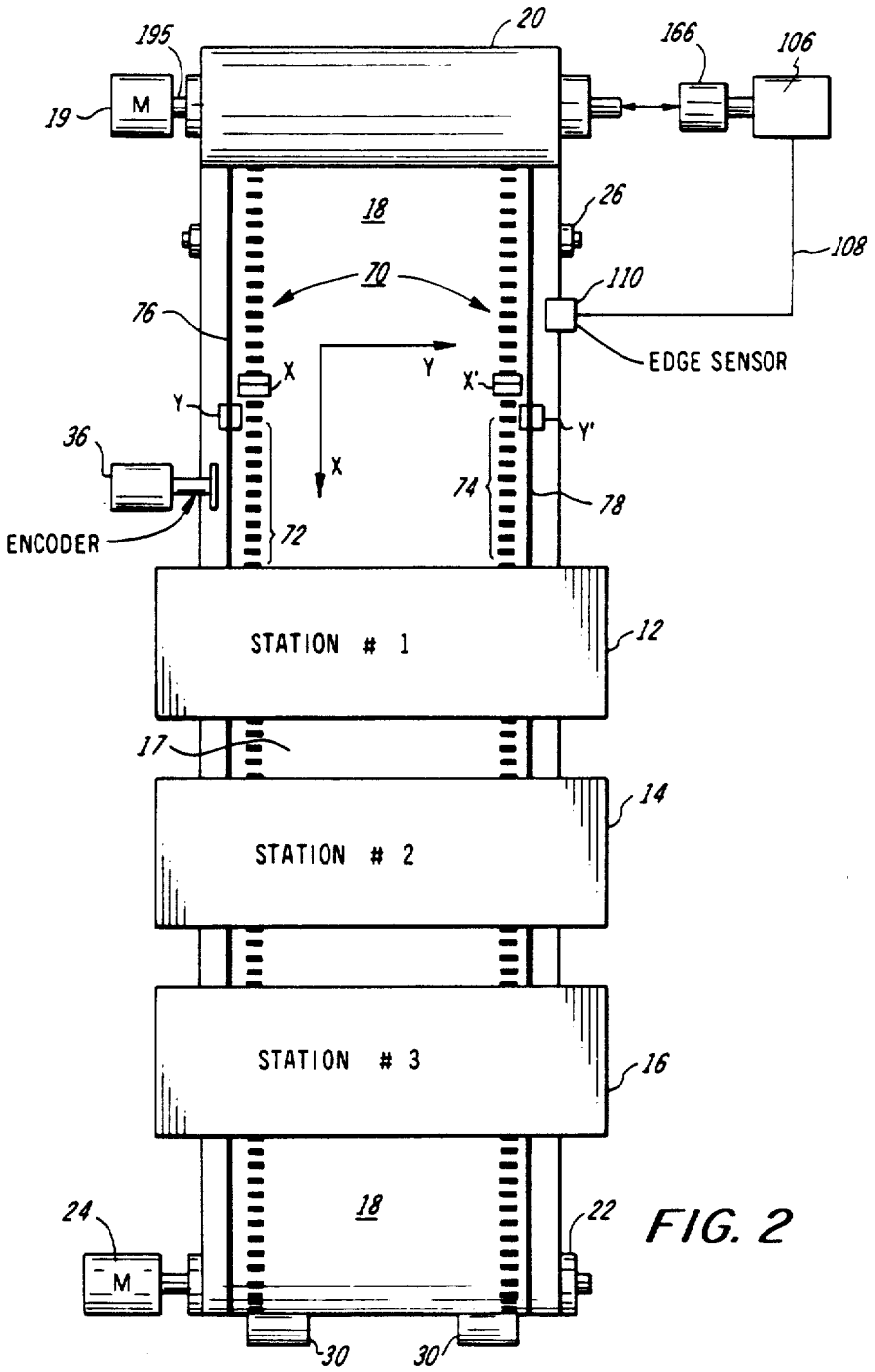
FIG. 2 is a schematic diagram showing a plan view of a portion of the system shown in FIG. 1.

Referring to FIGS. 1 and 2 there is diagrammatically shown system 10 of this invention. System 10 comprises [a] one or more processing stations 12, 14 16. Stations 12–16 are aligned in the path of web 18. Web 18 is drawn from supply roll 20 in the X direction over a series of rolls in the bed of system 10, by means of drive roll 22 driven by drive motor 24. These rolls are shown at 26 and 28. A series of rollers 30 are provided to ride against drive roll 22 in order to provide a firm grip on the web 18. The web 18 is taken up on take-up roll 32 driven by take-up motor 34.

Supply roll 20 is also provided with a drive motor 19 to rewind the paid out web 18 back onto supply roll 20 for further processing by system stations 12–16. The drive motor circuitry for rolls 20 and 32 is not shown, as such web handling is conventional in the continuous web handling art involving the manufacturing, coating, utilizing (e.g., reel to reel recording tape transport) and other processing of continuous web material. Basically, supply roll motor 19 is continuously applying a driving force in the direction of arrow 20' while take up motor 34 is continuously applying drive in the direction of arrow 32'. These oppositely opposed drives maintain web 18 in a state of equilibrium until drive motor 24 is enabled in either direction, as indicated by arrow 24', either to drive the web 18 forward at a relatively slow rate for processing by system 10 or to drive the web 18 reward at a relatively fast rate to wind the web 18 back onto supply roll 20. Drive servo control 48 drives and controls the speed and direction of drive motor 24 via line 50. Control 48 maintains selected motor speed by utilizing a speed servo loop including tachometer 52, the output of which is connected to control 48 via line 54. This type of control is conventional in the web handling art.

Encoder 36, backed by roller 38, is adapted to run with the moving web 18 and may be positioned at any convenient location along the web path through system 10. The output of encoder 36 is supplied to each of the position control circuits 42 and 44 and to a control circuit 46 via line 40. Encoder 36 provides a series of pulses per revolution, each pulse representative of an incremental distance of web movement.

The position control circuits 42 and 44 provide direction and correction pulses on respective line 56 and 58 to respective servo stepper motors 62 and 64 and control circuit 46 provides correction pulses on line 60 to processing station 16 to provide a desired correcting function. Servo stepper motors 62 and 64 in turn provide a desired servo function at respective stations 12 and 14.

As shown in FIGS. 1 and 2, pairs of photosensors X, Y, X', and Y' are positioned adjacent to the web 18 and preceeding the stations 12–14. These photosensors are actually pairs of photodiodes coupled at their cathode to a source of positive bias. Photosensor X comprises photodiodes 1X and 2X, photosensor X' comprises photodiodes 1X' and 2X', photosensor Y comprises photodiodes 1Y and 2Y and photosensor Y' comprises photodiodes 1Y' and 2Y'. These photosensors need not be positioned between the encoder 36 and the first statation 12. They may also be positioned in other locations along the path length of system 10 such as, for example, between stations 14 and 16. However, it is preferred that they be positioned in relatively close proximity to stations 12–16 since their detection capabilities relative to web 18 will be put to utilization at one or more of the stations.

Phototsensors X, X', Y and Y' also each include their own light source directed toward the web surface 17, which light sources are not depicted in the Figures.

As shown in FIG, 2 the photosensors X, Y, X' and Y' are physically mounted beneath the surface 17 of web 18 in a manner to be substantially aligned with the tracking indicia 70 which comprises a series of edge tracking marks 72 and 74 and two tracking lines 76 and 78. Sensor X is in a position to sense tracking marks 72. Sensor Y is in a position to sense tracking line 76, sensor X' is in a position to sense tracking marks 74 and sensor Y' is in a position to sense tacking line 78. As the surface 17 of web is drawn through the processing stations, the sensors X, X', Y and Y' and connected signal processing circuitry can monitor the indicia and utilize the information for various station functions.

As shown in FIG. 1, sensors Y and Y' have their respective outputs 80 and 82 connected to control circuits 42, 44 and 46. Sensors X and X' have their respective outputs 84 and 86 also connected to control circuits 42, 44 and 46.

Figure 16:
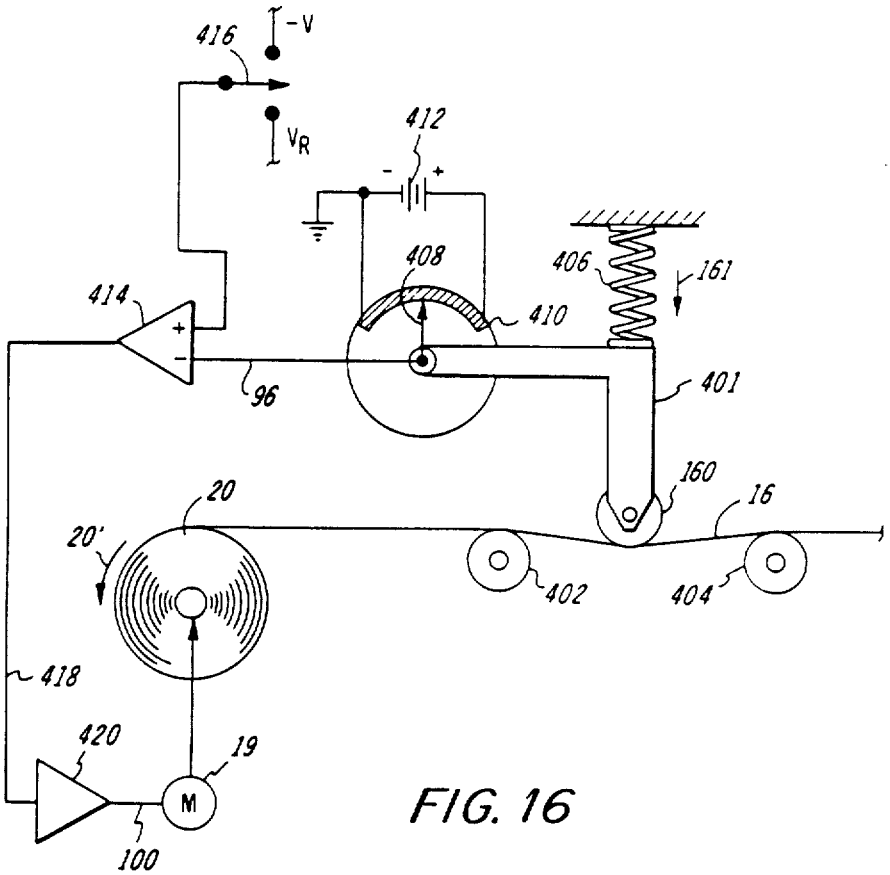
FIG. 16 is a detailed schematic diagram of an embodiment for the tension servo control shown in FIG. 1.

Adjacent to the payout of web 18 from supply roll 20 is dancer roll 90, which is supported in a conventional manner to provide predetermined level of bias on web 18 indicated by arrow 92. Means 94 is provided to monitor the applied predetermined tension *by* dancer roll 90. Means 94 may be an optical sensor positioned to determine relative vertical movement of dancer roll 90. On the other hand, means 94 may be an electrical sensor to determine such movement. Such an embodiment is illustrated in FIG. 16, which will be discussed later. Means 94 is connected by line 96 to tension servo control 98. Control 98, which includes a motor drive control, is coupled via line 100 to supply roll motor 19.

The function of dancer roll 90 is to ensure that a predetermined amount of tension is applied to web 18 as it is paid off of supply roll 20. The servo control 98 can monitor changes in the desired tension and either increase or decrease the back torque on motor 19, as the case may be, for correcting to the desired level of web tension.

Figure 3:
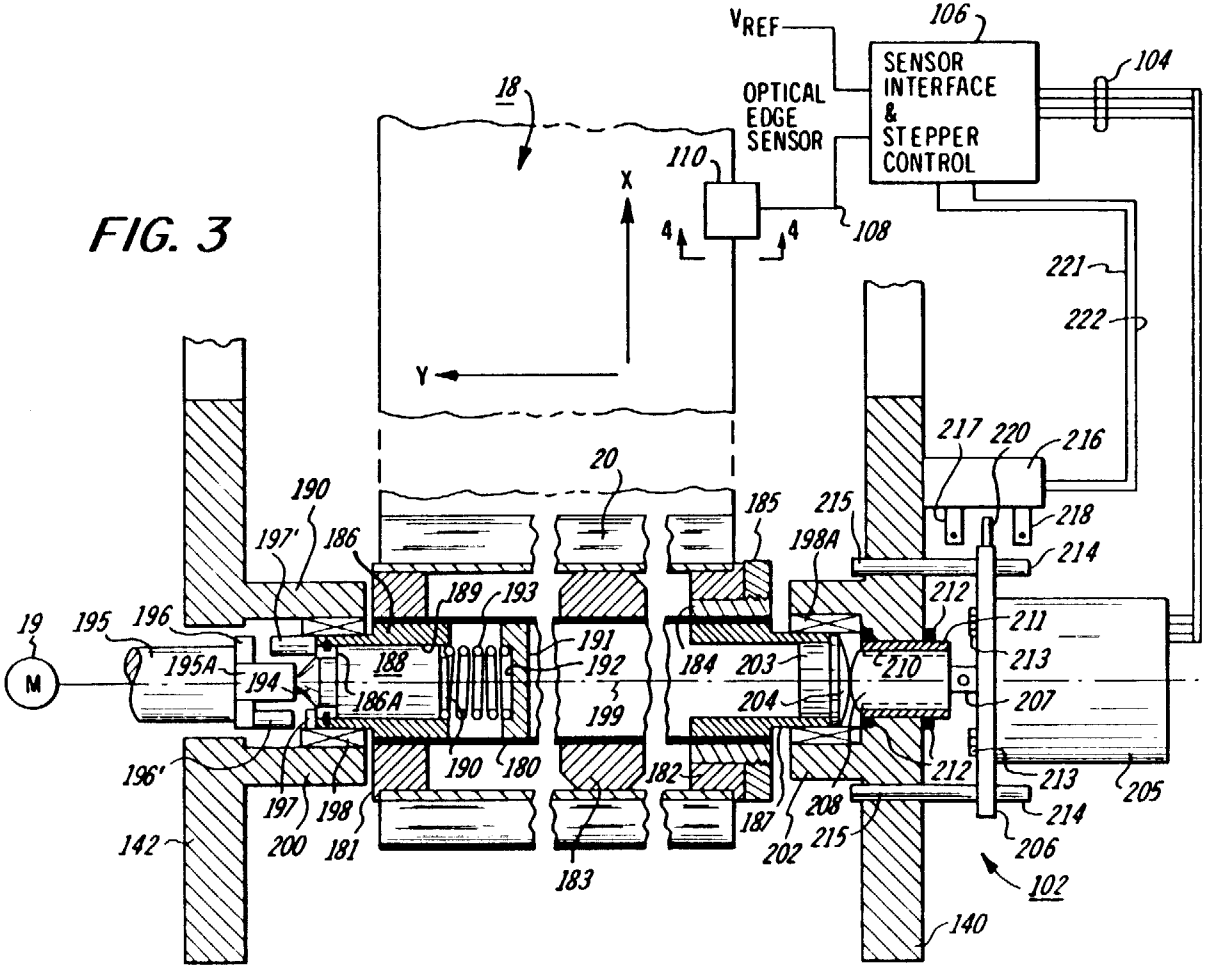
FIG. 3 is a schematic diagram of the means for lateral translation of the web supply roll in the system of FIG. 1.
Figure 12:
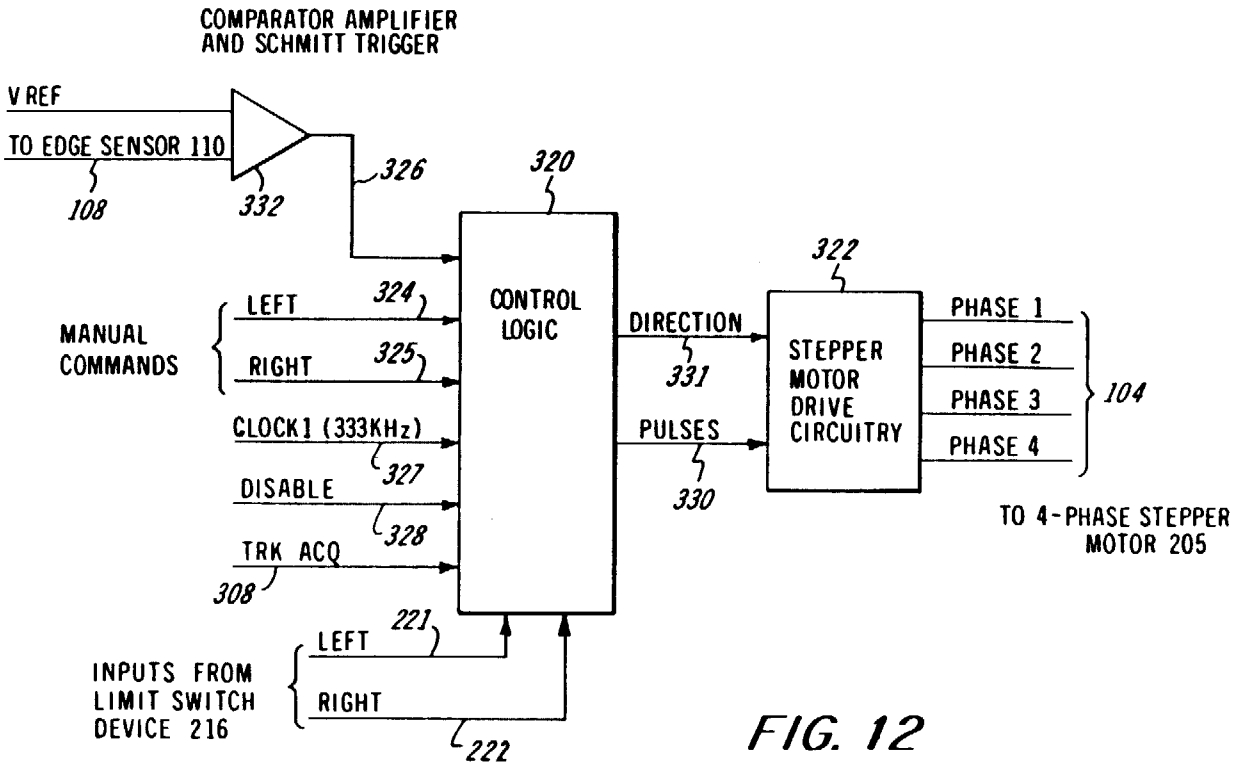
FIG. 12 is a circuit diagram for the web guide servo control in FIG. 1 to provide latent translation of the web supply roll.

Y adjustment for web 18, i.e., lateral adjustment of web position relative to processing stations 12–16, is achieved by a supply roll position actuator 102 shown in further detail in FIGS. 3 and 12. The actuator 102 includes step servo motor which receives input from the web guide servo control 106 via supply lines 104 to move the supply roll 20 laterally in either Y direction. An optical edge sensor 110 monitors the edge of web 18 and supplies an input via line 108 to web guide servo control 106 indicative of which direction the supply roll should be laterally moved for desired Y web alignment.

Figure 4:
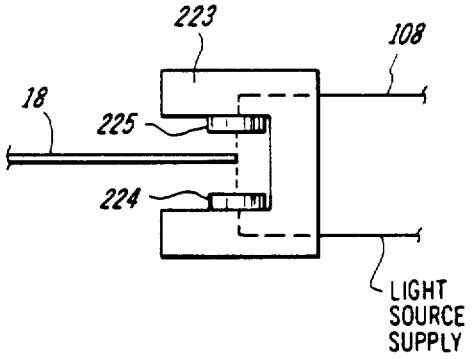
FIG. 4 is a section taken along the line of 4—4 of FIG. 3 showing a side view of the web edge detector used with the lateral translation means of FIG. 3.

Reference is now made to FIGS. 3 and 4 to explain in further detail the Y direction supply roll alignment. Supply roll 20 is rotatably supported in side frames 140 and 142 on a structure comprising roll tube 180 having end roll stops 181 and 182. Stops 181 and 182 support roll 18 on tube 180 with the aid of a roll spacer 183. Roll stop 181 is secured to tube 180 while stop 182 is removable. An externally threaded collar 184 is secured to the end of tube 180 opposite to stop 181. Once roll 18 is slipped over tube 180 and guide 183 with its end in engagement with stop 181, the removable stop 182 is slipped over collar 184 and held in position by means of roll nut 185 threaded upon collar 184. In this manner, supply roll 18 is held secured onto tube 180.

Left and right ends of roll tube 180 are provided with a respective bearing support members 186 and 187. Member 186 has a cylindrical passage 189 within which is slidably mounted the roll thrust plunger 188. The rearward extent of plunger 188 is provided with a circular projection 190.

Mounted internally within tube 180 is a plunger spring stop 191. Stop 191 is provided with a circular detent 192. Compression spring 193 is mounted between plunger projection 190 and stop detent 192 to urge plunger 188 out of passage 189. However, plunger 188 is held within passage 189 by means of stop ring 186A.

The forward end of plunger 188 is provided with a pointed projection 194 that contacts the end extension 195A of motor drive shaft 195. Shaft 195 is driven by supply roll motor 19.

Secured to the end of drive shaft 195 is a drive torque coupler 196. Formed on the outer end of bearing support member 186 is a roll coupler 197. Couplers 196 and 197 each have respectively one or more extensions 196' or 197' that will come into engagement with a corresponding complement extension on the other when rotational movement is applied in either direction to shaft 195. Thus, upon rotation of drive shaft 195, a coupler extension 196' of coupler 196 will come into contact with a corresponding extension 197' on roll coupler 197 so that roll tube 180 will be rotatably driven by shaft 195. Biased plunger 188 functions to maintain the couplers 196 and 197 in firm engagement with one another without interfering with the rotary operation of roll tube 180.

Bearing support member 186 is supported in roll sleeve bearing 198, which is supported in mount 190 which is part of side frame 142. Bearing support member 187 is supported at the other end of roll tube 180 in roll sleeve bearing 198A, which is supported in mount 202 which is part of side frame 140.

The end of bearing support member 187 is provided with a plug member 203 having a spherical end surface 204.

It should be noted that the bearing support members 186 and 187 may be supported in U-shaped or open ended bearings 198 and 198A. In this manner, the entire supply roll tube 180 may be easily inserted with its coupler end positioned (intercoupling of couplers 196 and 197) into place on bearing 198 followed by insertion of the other end of roll tube 180 at support 187 on bearing 198A. Spherical end surface 204 will ride smoothly over the forward end of threaded screw 208 due to the bias action of plunger 188. This action eliminates any damages that might be caused to the actuactor 102 upon insertion of the roll tube 180 onto bearings 198 and 198A.

Position actuator 102 comprises stepper motor 205 which is mounted on a frame plate 206 via bolts 213. The output shaft 207 of motor 205 secured to threaded roll drive screw 208. Screw 208 is provided with an external thread of predetermined pitch. An opening 210 is provided in side frame 140 into which is mounted an internally threaded bushing 211 and is secured to frame 140 by means of fasteners 212. Threaded bushing 211 has the same thread pitch as drive screw 208 so that upon rotational movement of motor shaft 207, the drive screw 208 will move laterally away from or against plug member 203 depending on the direction of rotation of shaft 207. In order to provide for this translatory motion, stepper motor 205 must be mounter to move with the translatory motion of drive screw 208. This is accomplished through movably mounted frame plate 206.

Frame plate 206 comprises a flat plate with a pin 214 extending from each plate corner. The pin members 214 are slidably positionable in corresponding openings 215 formed in side frame 140. Operation of motor 205 will cause translatory motion of drive screw 208 along the axis 199 of roll tube 180 so that the supply roll 20 can be positioned in the Y direction for lateral alignment of the web 18 as it is fed into the processing station 12. This translatory motion can be applied to roll tube 180 independent of the rotational opertion of the roll tube 180 by supply roll motor 19 via shaft 195 and the extended couplers 196 and 197.

Limit switch device 216 is mounted on side frame 140. Like devices 150 and 152, device 216 is provided with two optical sensor and light source pairs respectively at 217 and 218. A flag 220 is mounted on the top edge of frame plate 206. Upon continuous operation of stepper motor 205 in either direction, flag 220 will eventually insert the light source beam to a respective sensor causing termination of the operation of motor 205 via web guide servo control circuit 106. Thus, sensor/light source pairs 217 and 218 represent the maximum limits of translatory motion for actuator 102.

The respective outputs 221 and 222 of sensor/source pairs 217 and 218 are supplied as inputs to circuit 168. As previously indicated, optical edge sensor 110 has its output on line 167 connected to circuit 168.

As shown in FIG. 4, sensor 110 comprises a U-shaped frame 223 with a light source 224 mounted on one leg of the frame in oppositely opposed relation to a photosensor 225 mounted on the other leg of frame 223. Sensor 110 is mounted relative to side frame 140. The sensor 110 is employed in a manner so that it is midway between a position wherein photosensor 225 detects full illumination from source 224, i.e., the web 18 is not in the path of the light source 224 and a position wherein photosensor 225 is completely blocked off from the illumination from source 224, i.e., the web 18 is completely in the path of the light source 224.

Circuit 106 performs to basic functions: an optical sensor interface and stepper control. These functions will be further detailed in connection with the description of FIG. 12. In general, the operation of stepper motor 205 is such that upon activation via circuit 106, motor 205 is driven to translate roll tube 180 to the inner maximum limit until flag 220 intersects the light beam of sensor/source pair 217 which stops the operation of motor 205. Motor 205 is then operated a predetermined amount in the opposite direction to the proximate midpoint wherein the edge of web 18 is halfway over photosensor 225. At this point, flag 220 is about half way between pairs 217 and 218. The sensor interface of circuit 102 includes a comparator having one input from photosensor 225 and another input from a voltage reference, $V_{REF}$. $V_{REF}$ represents in electrical quantity, the coarse Y position desired for web 18. The voltage value from photosensor 225 via line 169 is compared with $V_{REF}$ to determine if stepper control should be activated to roll readjust the position of tube 180 along the Y direction and reposition the web edge as the web is being paid off of supply roll 20. As an example, the magnitude of adjustment of supply roll translation may be plus or minus 10 mils. Stepper motor provides 240 steps revolution of its output shaft. If the thread pitch of drive screw 208 is 10 turns per inch, then one revolution of the output of motor 205 comprises about 2000 steps per inch and each step of motor 205 is 0.5 mil translatory step.

Explanation will now be directed to the registration means for providing stepper motor control signals or correction signals to desired adjustments at processing stations 12–16. The adjustments to be accomplished are based upon optical monitoring of tracking indicia 70 on the web surface 17. In order to properly understand this registration means, a sufficient comprehension of the tracking indicia should be realized.

Figure 5:
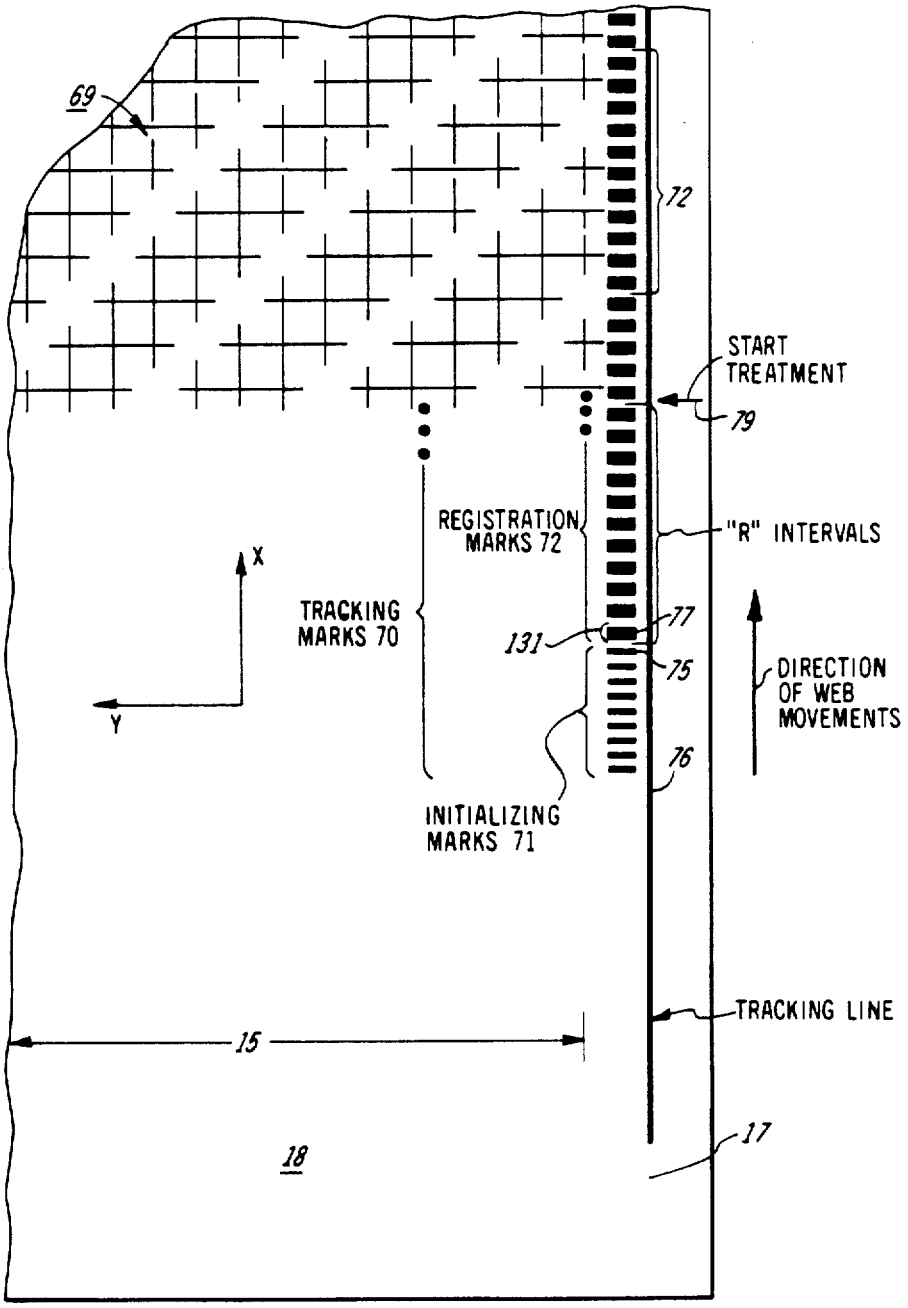
FIG. 5 is a plan view of portion of a web section illustrating tracking indicia of this invention.

In FIG. 5, an edge section of recording web 18 is shown. Within the field 15 of the web 18 is shown an area 69 to be treated by one or more processes at the respective processing stations 12–16. Such processes could include specialized coating or web surface treatment or printing.

As previously indicated in connection with the description of FIG. 2, tracking indicia 70 includes registration marks 72 and tracking line 76. The registration marks 72 are of equal width and separated by a space equal to their width. The marks 72 are employed to determine dimensional changes of web 18 in the X direction. The tracking line 76, together with tracking line 78 on the opposite edge of the web 18, are employed to determine dimensional changes of web 18 in the Y direction.

Mention should be made of the fact that tracking indicia 70 may be preprinted on the web surface 17 or printed at the time of web processing. In the latter case, one of the stations 12–16 may be a printing station for the indicia which are printed prior to web treatment at the other stations.

Also, it should be realized that as an alternative to printed indicia 70, a series of rectangular perforations adjacent one or both edges of web 18 may be utilized as tracking indicia. In this embodiment, the light source for the photosensors X, X', Y, and Y' would be positioned on the top side of the web in oppositely opposed relation to one or more photosensors.

Means may be provided to determine the precise point wherein web treatment will commence on web 18. This point is indicated by arrow 79 in FIG. 5 and is the start point. This point is calculated by the determination point of the first registration mark 77 after the identification of a series of initializing marks 71 before the beginning of the line of registration marks 72. The initializing marks 71 are used to perform two functions. The first function is to permit the start treatment circuitry of FIG. 11 to determine if the circuitry is, in fact, identifying purposeful marks formed on the web, vis a vis other marks, such as scratch marks or foreign marks present on the web surface 17. Once the circuitry has recognized that it has detected the series of initializing marks 71, then the circuitry can be enabled to determine the START TREATMENT point at 79. This determination is made from the transition from the last narrow initializing mark 75 to the first wider registration mark 77. This change of interval spacing is represented by pointer 79. Once this change has been recognized by the circuitry, the point 79 of START TREATMENT can be precisely determined. The circuitry is designed to count pulses produced by encoder 36. Pulses are counted between transitions from the point where a pair of photosensors detect a balanced condition of light to the next balanced condition of light. For example, the initializing marks 71 may be one third the size or width of the registration marks 72. This means that for a cycle from one light balanced condition to the next, there will N encoder pulses counted by the circuitry. This is less counted pulses than is detected for the cycle generated from the registration marks which will be about two thirds longer or equal to $N+\frac{2}{3}N$. This difference in the number of counted encoder pulses in transition from mark 75 to mark 77 is employed to determine where the START TREATMENT point 79 will begin on web 18.

Figure 8:
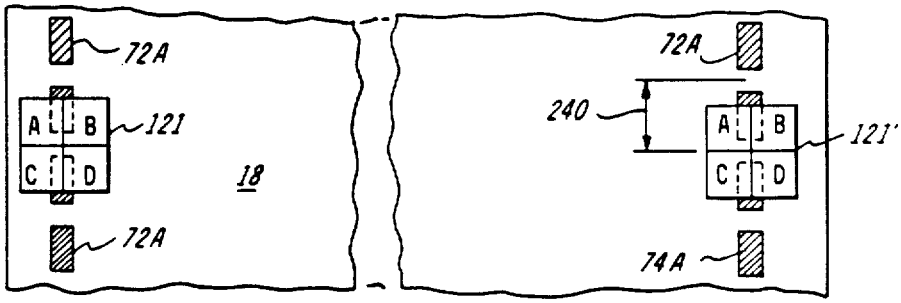
FIG. 8 is a plan view of the same embodiment of tracking indicia as disclosed in FIG. 7 but with a different X and Y photosensor arrangement.
Figure 9A:
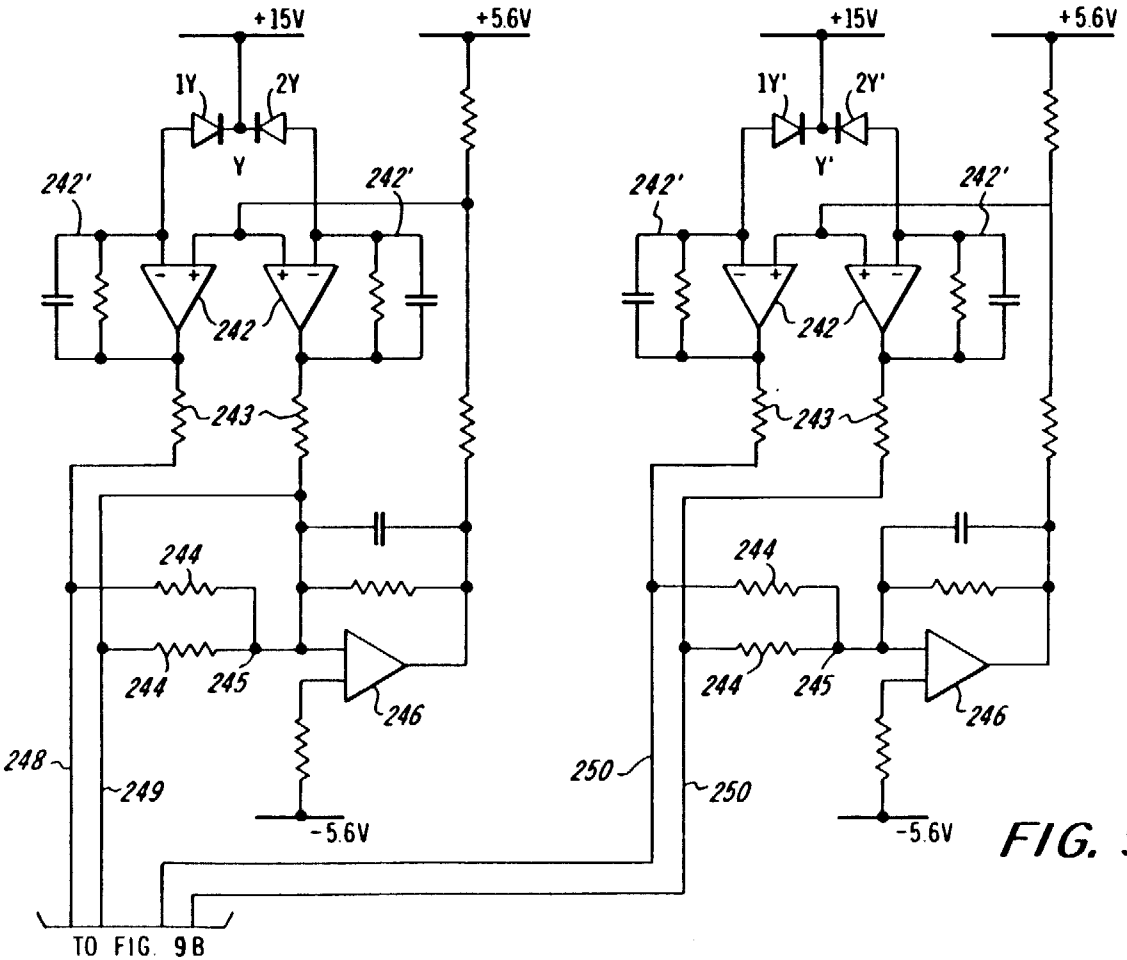
FIGS. 9A and 9B are circuit diagrams for the development of electrical signals representative of the output from the Y photosensors.
Figure 9B:
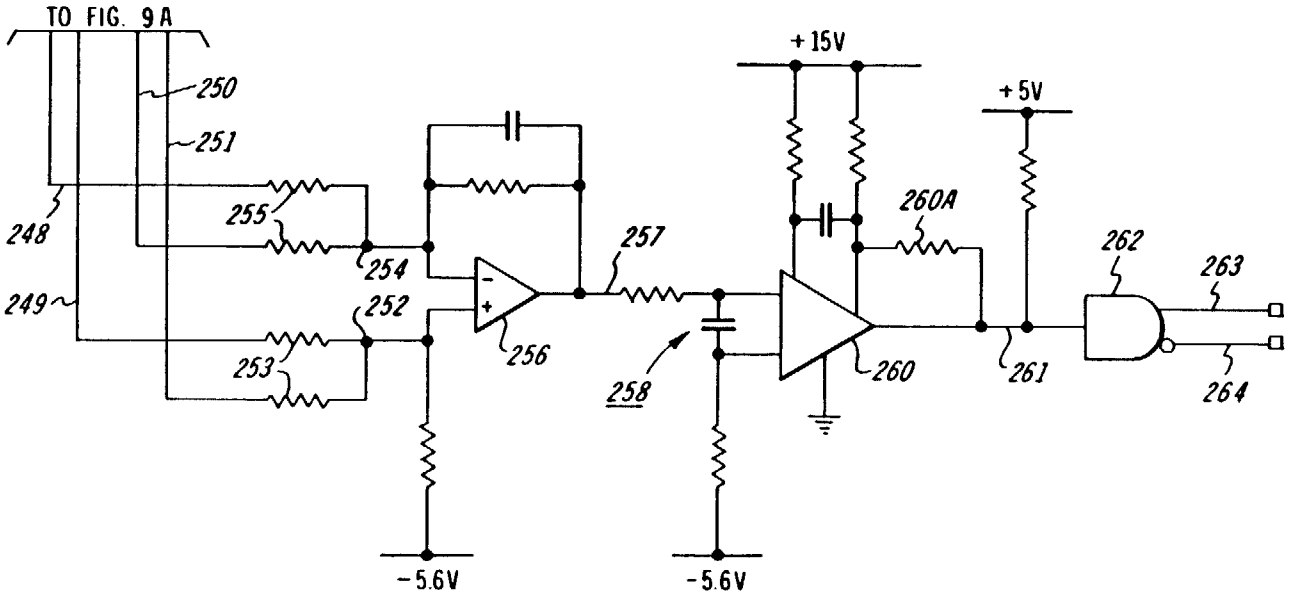
Figure 10:
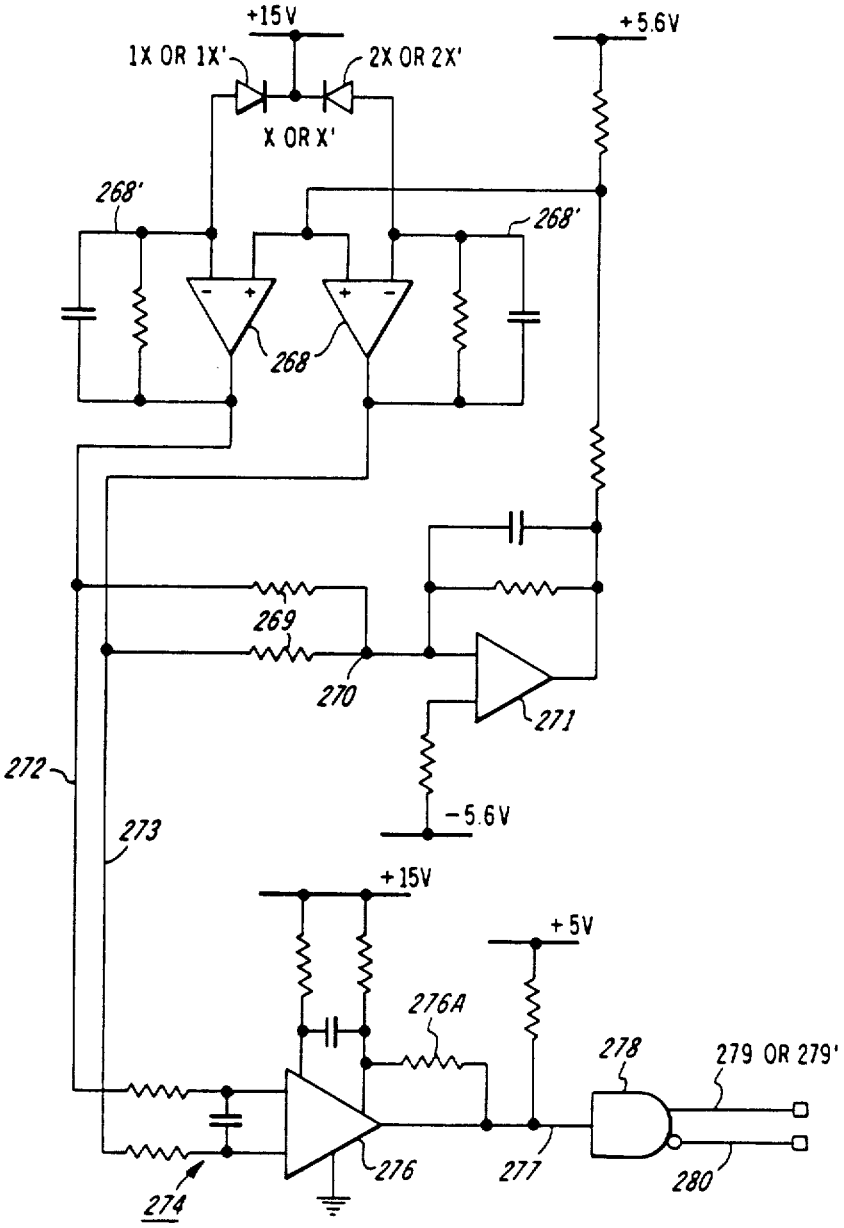
FIG. 10 is a circuit logic diagram for the development of electrical signals representative of the X photosensors.

Before discussing circuitry relating to initializing mark determination and START TREATMENT determination, reference will be made to the relationship of the photosensors X, Y, X' and Y' to the tracking indicia 70 (FIGS. 6, 7 and 8) and the initial photosensor signal processing circuitry for the electrical signals received from these photosensors (FIGS. 9 and 10).

Figure 6:
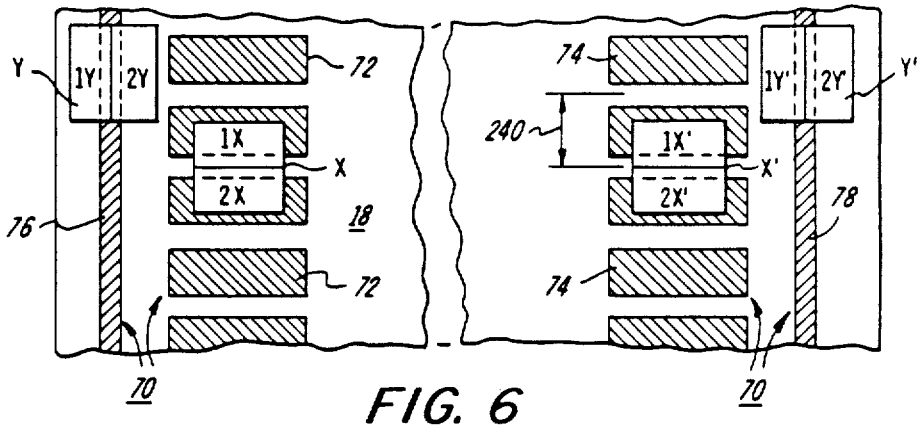
FIG. 6 is a plan of one embodiment of tracking indicia as applied to the web and as arranged with X and Y photosensors.

The tracking indicia 70 shown in FIG. 2 is shown in enlarged detail in FIG. 6. For determining web dimensional changes in the X direction, a series of registration marks 72 are needed only along one edge of the web. With these registration marks 72 and 74 provided along both edges of the web, however, it is believed that improved discernment of such changes may be possible. Also, skewing of the web along its path through system 10 can be discerned and station $\theta$ (rotational) position changes can be considered.

For determining web dimensional changes in the Y direction, a pair of tracking lines 76 and 78 are provided, one along each web edge. By monitoring positional changes in the Y direction of line 76 relative to photosensor Y and line 78 relative to photosensor Y', it is possible to determine if the web 18 has expanded or contracted.

To discern web dimensional changes in the X direction, the control circuitry 42 or 44 will be constantly counting up encoder pulses from encoder 36 between light balance conditions of an X and/or X' photosensor pair. For example, in FIG. 6, the photosensor pair 1X' and 2X' are shown at this balanced transition point. As the web moves to the next such transition point, completing a cycle 240, the number of pulses received and from the encoder 36 will be indicative of (1) no dimensional changes (an expected count has been received), (2) a shrinkage of the web has occurred (an insufficient number below the expected count has been received), or (3) a stretch or expansion of the web has occurred (a larger amount number than expected count has been received) In the actual embodiment employed, the expected count is 448 encoder pulses within the time of a cycle represented by the distance 240.

To discern web dimensional changes in the Y direction, the control circuitry 42 or 44 will be monitoring light balance conditions of photsensors Y and Y' so that if these sensor pairs are straddled equally over their respective tracking lines 76 and 78, a balance condition will exist. If the sensor pairs indicate a change wherein either or both sensors 2Y and/or 1Y' sense more light than their companion sensors 1Y and 2Y', then there has been a detected expansion of the web in the Y direction. Y translation of processing stations 12 or 14 or a component part of those stations may be initiated for relative Y movement until a balanced condition is reached relative to the total light received from both the Y and Y' photosensors.

If the sensor pairs indicate a change wherein either or both sensors 1Y and/or 2Y' sense more light than their companion snesors 2Y and 1Y', then there has been a detected shrinkage of the web in the Y direction. Y translation of the processing station or station component may be initiated until a balanced condition is reached relative to the total light received from both the Y and Y' photosensors.

To discern a skew in the position of web 18, the control circuitry 42 or 44 will be monitoring the light balance conditions along both lines of registration marks 72 and 74. If the count of encoder pulses per cycle 240 differ along one side relative to the other so that there is, for example, a higher expected count on one side as compared to an expected count or a lower than expected count on the other side, then there has been a detected skew of the web in its path through the system 10. The $\theta$ translation of a processing station 12 or 14 or station component may be initiated until a balanced condition is reached relative to the total light received from both the Y and Y' photosensors.

Figure 7:
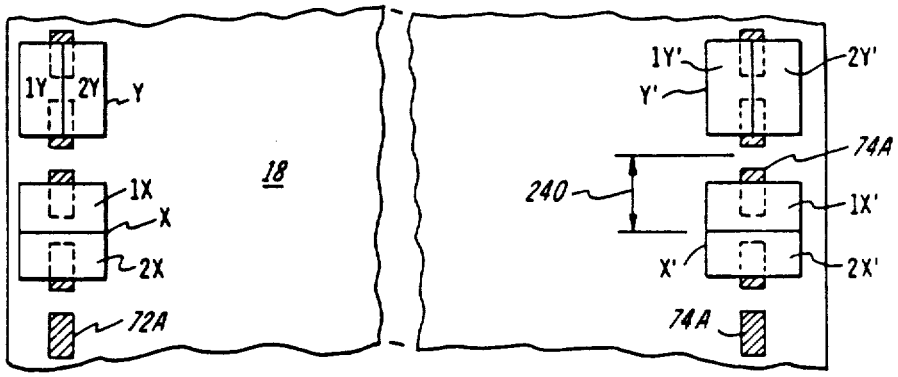
FIG. 7 is a plan view of another embodiment of tracking indicia as applied to the web.

In the alternative embodiment of FIGS. 7 and 8, the tracking lines 76 and 78 can be eliminated and the tracking mark lines consisting of the series of marks 72A and 74A may provide both X, Y and $\theta$ monitoring functions as in the case of the embodiment shown in FIG. 6. The Y and Y' photosensors employ the lines of marks 72A and 74A as a means to determine expansion and shrinkage conditions of the web in the Y direction while the X and X' photosensors employ the spaced marks 72A and 74A to determine the number of encoder pulses occurring per cycle 240 for determination of expansion and shrinkage conditions in the X direction as well as web skew conditions.

The same lines of marks 72A and 74A are shown in the embodiment of FIG. 8. However, in FIG. 8, photosensors 121 and 121' are quad sensors. The combination of quad sensors 121A and C and 121 B and D; 121' A and C and 121'B and D perform the functions of sensors 1Y and 2Y; 1Y' and 2Y', respectively. The combination quad sensors 121 A and B and 121 C and D; 121' A and B and 121' C and D perform the functions of sensors 1X and 2X; 1X' and 2X', respectively. FIG. 9 shows the initial signal processing circuitry for the Y and Y' photosensors. This circuit may be at the Y and Y' photosensors or part of the circuit at the postion control 42 or 44. The cathodes of photosensors 1Y and 2Y; 1Y' and 2Y' are connected together to a positive voltage source. The anodes of these sensor pairs are connected to the inverting input of a conventional operational amplifiers 242. The feedback RC filters 242' on these amplifiers provide low bandwidth on the input signals from the photosensors Y and Y'. The output of the amplifiers 242 is supplied via isolation resistors 243 and respective lines 248, 249, 250 and 251, via summing resistors 244 to a summary node 245 which is connected to an input of summing amplifiers 246. The other input of amplifiers 246 is connected to a reference voltage, e.g., —5.6 volts. The output of the summing amplifers 246 is connected via isolation resistors and a positive voltage bias to the noninverting inputs of operational amplifiers 242. The purpose of this feedback is to provide for automatic stabilizing of the sensed inputs independent of different light levels that the photosensors Y and Y' might receive from the provided light sources. The magnitude of light from the sources will vary or decrease over a period of time. The feedback amplifiers 246 endeavor to maintain the summing nodes 245 at the same voltage as the reference voltage, e.g., —5.6 volts so that the output voltages of amplifiers 242 are always at the same desired levels regardless of changes in light source intensities over a period of time.

The adjusted outputs on lines 249 and 251 for photosensors 2Y and 2Y' respectively are supplied to summary node 252 via summing resistors 253. The adjusted outputs on lines 248 and 250 for photosensors 1Y and 1Y' respectively are supplied to summing node 254 via summing resistors 255. The summed voltage value at node 252 is supplied to the noninverting input of linear differential amplifier 256 while the summed voltage value at node 254 is supplied to the inverting input of amplifier 256. The output on line 257 of amplifier 256 is thus representative of any differences in light level conditions determined by sensors 2Y and 2Y' as compared to sensors 1Y and 1Y'. This difference may be representative of left or right corrections relative to web position, as the voltage on output line 257 goes above or below the reference of —5.6 volts placed on the noninverting input at node 252. High gain differential comarator 260 receives the output 257 as an input and this comparator is also referenced to the reference voltage of —5.6 volts, being its other input. Comparator 260, therefore, makes a sharp determination that the output on line 257 is above or below the reference voltage.

The output on line 257 of linear differential amplifier 256 is filtered by RC filter 258 and is, as previously indicated, an input to the high gain differential comparator 260. The other input of comparator 260 is connected to the reference voltage —5.6 volts. Comparator 260 has a small band of sensitivity so that very small changes on line 257 either positive or negative relative to the reference input to comparator 260 will provide a corresponding negative or positive output voltage on line 261. Feedback resistor 260A for comparator provides a hysteresis operating effect for differential comparator 260. The output of differential comparator 260 on line 261 is supplied as an input to the TTL buffer circuit 262. The output of circuit 262 on line 263 will be either a logic high or "1" or a low or "0". These two conditions indicate whether the off balance condition has been detected by the Y photosensors, i.e., a high or "1" output condition indicates that the photosensors are to the left relative to the center of tracking lines 76 and 78 and, therefore, a move to the right is required for head centering while a low or "0" output condition indicates that the photosensors are to the right relative to the center of tracking lines 76 and 78 and, therefore, a move to the left is required for head centering. The inverted output at line 264 is shown but not used in this embodiment.

Having explained the logic meaning of the output on line 263, reference is again made to FIG. 6. There are two different types of alignment conditions and two types of misalignment conditions to consider. The first alignment type is where there is no dimensional offset, i.e., the center-to-center dimensions of the 1Y and 2Y, and 1Y' and 2Y' sensor pairs are identical disecting both tracking lines 76 and 78. This is the case illustrated in FIG. 6. The second alignment type is where there is a dimensional mismatch, i.e., the center-to-center dimensions of the 1Y and 2Y, and 1Y' and 2Y' sensor pairs are not dissecting the tracking lines 76 and 78 but are shifted toward each other or away from each other the same distance relative to the center axis of the tracking lines. Since sensors 1Y and 1Y' and sensors 2Y and 2Y' are summed together, the comparative outputs will be the same in this instance and no Y head position correction will be initiated.

The first misalignment condition is where sensor pairs 1Y and 2Y and 1Y' and 2Y' are respectively shifted in the same direction, either left or right, relative to the center axis of the tracking lines 76 and 78. In the condition where they are both shifted, for example, to the right as viewed in FIG. 6, the output level from the summed sensors 1Y and 1Y' will exceed that of summed sensors 2Y and 2Y' so that the output 263 of circuit 262 will indicate a high or "1" condition. This means that a move to the right for head positioning is required in order that the sensor pairs will be aligned again on the center axis of the tracking lines 76 and 78.

In the condition where they are both shifted to the left as viewed in FIG. 6, the output level from the summed sensors 2Y and 2Y' will exceed that of the summed sensors 1Y and 1Y' so that the output 263 of the circuit 262 will indicate a low or "0" condition. This means that a move to the left for head positioning is required in order that the sensor pairs will be again aligned on the center axis of the tracking lines 76 and 78.

The second misalignment condition is where one sensor pair is shifted either to the left or to the right of the center axis of one of the tracking lines while the other sensor pair is centered on the center axis of the other tracking line. For example, assume that the sensor pair 1Y' and 2Y' in FIG. 6 is centered on tracking line 78 as shown and assume further that the center of sensor pair 1Y and 2Y has shifted to the left so that their center is centered over the left edge of tracking line 76. Since the outputs of sensors 1Y and 1Y' are summed together and the outputs of sensors 2Y and 2Y' are summed together, the output level from the summed sensors 1Y and 1Y' will exceed that of summed sensors 2Y and 2Y' so that the output 263 of circuit 262 will indicate a high or "1" condition. This means that a move to the right for head positioning is required in order that the sensor pairs will be aligned in the manner explained for the second type of alignment condition.

By the same token, assume that the sensor pair 1Y and 2Y in FIG. 6 is centered on tracking line 76 as shown and assume further that the center of sensor pair 1Y' and 2Y' has shifted to the right to be beyond the right edge of the tracking line 78 so that their center is off of the tracking line. The output level from the summed sensors 2Y and 2Y' will exceed that of summed sensors 1Y and 1Y' so that the output 263 of circuit 262 will indicate a low or "0" condition. This means that a move to the left for head positioning is required in order that the sensor pairs will be aligned in the manner explained for the second type of alignment condition.

In both of these examples for the second type of misalignment, the offset of the misaligned sensor pair 1Y and 2Y or 1Y' and 2Y' (whichever the case) could be in the opposite Y direction relative to the center axis of the respective tracking line. In such cases, the corrective head positioning move would be in the opposite direction relative to the directions given in each of the above examples.

FIG. 10 discloses the initial signal processing circuitry for the X and X' photosensors. The circuit for sensor pairs 1X and 2X is the same for sensor pairs 1X' and 2X' so that only a single circuit need be shown.

The cathodes of photosensors 1X and 2X or 1X' and 2X' are connected together to a positive voltage source. The anodes of these sensors are connected to the inverting input of the conventional operational amplifiers 268. The feedback RC filters 268' and these amplifiers provide low bandwidth on the input signals from the photosensors X and X'. The output of these amplifiers on respective lines 272 and 273 is supplied via summing resistors 269 to a summing node 270 which is connected to an input of summing amplifier 271. The other input of amplifier 271 is connected to a reference voltage, e.g., —5.6 volts. The output of the summing amplifier 271 is connected via an isolation resistor and a positive voltage supply to the noninverting inputs of operational amplifiers 268. The purpose of this feedback, as mentioned in connection with FIG. 9, is to provide for automatic stabilizing of the sensed inputs independent of different light levels that the photosensors might receive from the provided light sources. The feedback amplifier 271 endeavors to maintain the summing node 270 at the same voltage as the reference voltage, e.g., —5.6 volts, so that the output of the amplifiers 268 are always at the same desired levels regardless of changes in light source intensities over a period of time.

The adjusted outputs on lines 272 and 273 are supplied as inputs to differential comparator 276 via RC filter 274. The output on line 277 of comparator 276 represents any difference in the light level sensed by photosensor pairs 1X or 2X; 1X' or 2X' so that, for example, when 1X senses more light than 2X, the output on line 277 will be positive or when 2X senses more light than 1X, the output on line 277 will be negative. Comparator 276 has a small band of sensitivity so that very small differences between the signals to the inputs of comparator 276 will provide a corresponding negative or positive output voltage on line 277. Feedback resistor 276A for comparator 276 provides a hysteresis operating effect for differential comparator 276. The change on line 277 is supplied as an input to TTL buffer circuit 278. The noninverted output 279 (or 279' in the case of X') of circuit 278 represents either a logic high "1" or low or "0" condition. The inverting output 280 of circuit 278 is not used in this embodiment.

A high to low transition occurring on line 279 indicates a beginning of a cycle 240 between adjacent registration marks 72 or 74, i.e., a balanced maximum light condition has been achieved by sensor pairs as positioned in FIG. 6, while a low to high transition occurring on line 279 indicates a transition occurring in the middle of a cycle 240 wherein a balance minimize light condition has been achieved by sensor pairs as positioned over the center of a registration mark 72 or 74.

Figure 11:
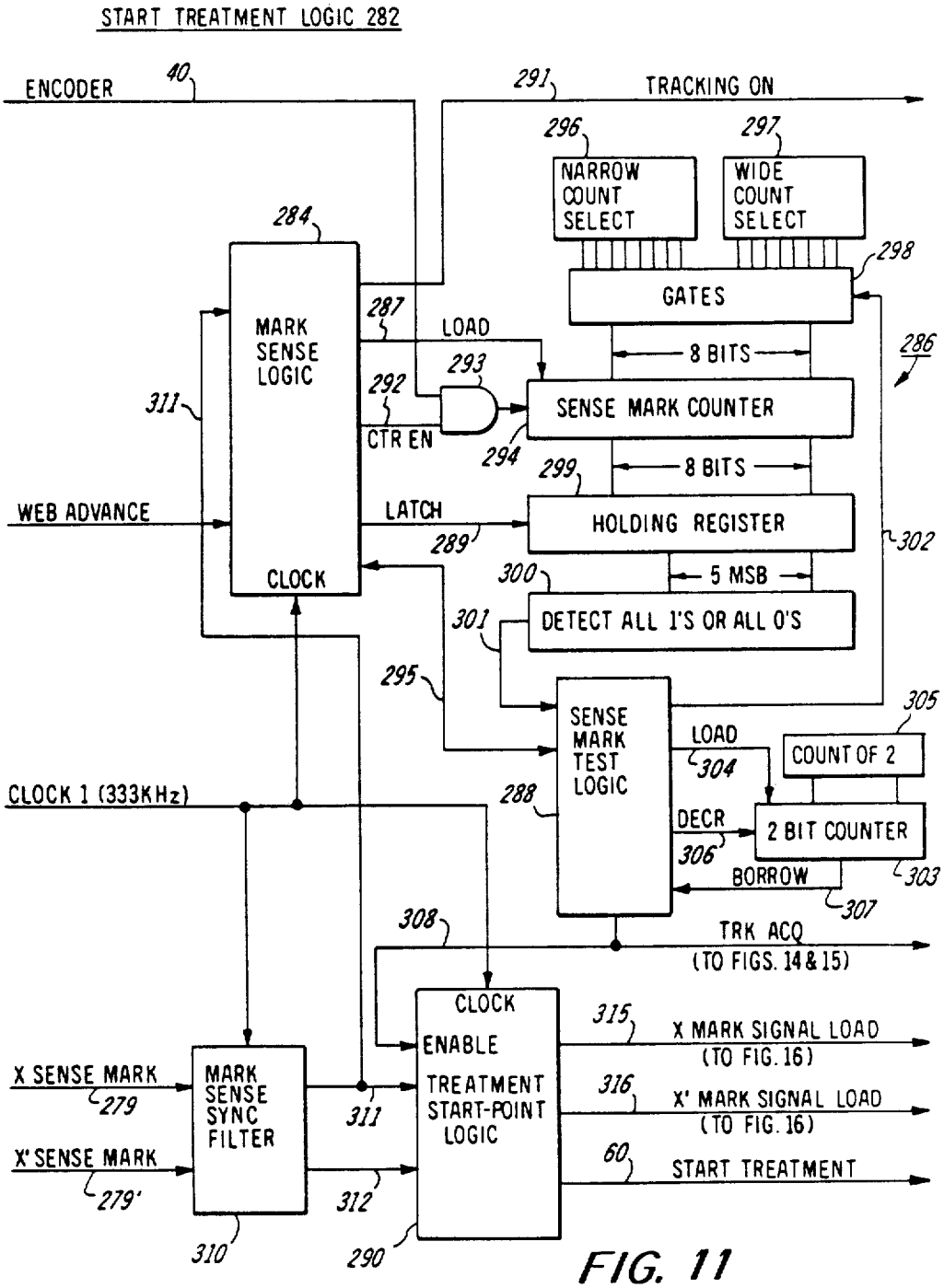
FIG. 11 is a circuit diagram for use in the determination of the beginning point for web processing at a processing station.

Reference is now made of FIG. 11 which is part of the circuit for position controls 42–46 in FIG. 1. As will become evident, when the circuit of FIG. 11 is employed as an embodiment for control 46, only output line 60, START TREATMENT, need be utilized. All the other outputs provided on lines 291, 308, 315 and 316 together with the output on line 60 are utilized for position controls 42 and 44.

The circuit of FIG. 11 relates to the START TREATMENT logic for determining (1) whether the initializing marks 71 have detected, (2) when the first registration mark 77 has been detected to determine the beginning point on the web for the point of START TREATMENT, and (3) the enablement of appropriate functions at stations 12–16.

Start treatment logic 282 comprises four principle components, mark sense logic 284, counting circuitry 286, sense mark test logic 288 and treatment start point logic 290. Logic 284 consists of conventional and/or gate and flip flop logic for receipt and interpretation of the three inputs and sequencing the outputs to the counting circuitry 286. The counting circuitry 286 is adapted to count received pulses in a manner that provides a rough but accurate determination that a narrow initializing mark 71 has been observed or that a wide registration mark 72 has been observed. The sense mark test logic 288 is for determining that N "hits" have been made relative the detection of the series of initializing marks, i.e., that N initializing marks 71 have been determined to be in the view of the X sensor and that the circuit should be initialized for the detection of a registration mark 74. The sense mark test logic 288 takes the hit count from circuit section 286, keeps track of the number of hits made determines when N hits have been made. Treatment start point logic 290 permits the commencement of other logic functions after the first registration mark 77 has been observed.

The main purpose of mark sense logic 284 is to initially load and reset counter 294, enable the counting of encoder pulses on line 40 upon receipt of X sense mark signal 279 via filter 310 and line 311 and latch the output in register 299 for the final value achieved in counter 294 between X mark sense intervals.

Mark sense logic 284 has two inputs, WEB ADVANCE and X SENSE MARK. WEB ADVANCE is an indication from the drive servo control 48 of the advancement of the web 18.

When the signal, WEB ADVANCE, to mark sense logic 284 is low, logic 284 is disenabled and, therefore, the start treatment logic 282 is disenabled. When signal, WEB ADVANCE, goes high, mark sense logic 284 is placed in a readiness state to be in a position to permit the function of looking for tracking indicia 70.

When signal, WEB ADVANCE, goes high, a high (LOAD) is placed on logic 284 output line 287 from mark sense logic 284 to permit counter 294 to load in the value for a narrow sense mark representative of an initializing mark 71 from the memory switch 296 via gates 298.

Also, at this time the output TRACKING ON on line 291 of mark sense logic 284 goes high.

Line 295 is a handshaking and acknowledgement function between mark sense logic 284 and test logic 288. When X sense mark signals from line 279 are being received via line 311 in mark sense logic 284, mark sense logic 284 will provide an indication to sense mark test logic 288 to look for the appropriate indication that a hit has been made and also to initialize for counting N initialize marks.

Counting circuitry 286 comprises a counter that is able to determine roughly when a narrow mark interval or a wide mark interval has been observed. This function need not be highly accurate, i.e., it can be within 10 percent of the actual interval and confirm that the appropriate mark interval has been observed.

Memory switch 296 contains an 8 bit count representative of a narrow mark interval. This count value is present on gates 298, which function like a series of AND gates. The count value is placed into counter 294 upon the LOAD received on line 287.

Output lines 279 and 279' from FIG. 10 are supplied as inputs to mark sense sync filter 310. The function of filter is to synchronize these signals with the fast $3\mu$ clock of the circuitry as well as determine that the signals received are in fact sense mark intervals. This is accomplished by determining that the mark sense intervals persist for at least N number of clock pulses, e.g., 3 clock pulses. The X sense mark output of sync filter 310 appears on line 311 which is an input to both mark sense logic 284 and treatment start point logic 290. Upon receipt of this input, logic 284 places this input on output 292, COUNTER ENABLE (CTR EN) to AND gate 293. This output represents the cycle of one mark sense interval so that as AND gate 293 is enabled by a negative going mark interval transition, encoder clock pulses on line 40 will be fed into counter 294 for counting. The count value in counter 294 is decremented by the enabled encoder pulses for each mark sense interval and value remaining per interval is latched into holding register 299 via line 289. When the count value is decremented somewhere close to the value of a series of encoder pulses between mark sense intervals, either above or below that value, the count held in register 299 will be at a point close to either all binary 0's or 1's indicative that the decremented count is on the verge of being a match with the count value in memory switch 296. Since only a rough approximation is needed as to mark sense interval being detected, only the 5 most significant bits are examined and held in register 300. When the 5 most significant bits are all binary 1's or 0's, a "hit" has been scored and the indication of a "hit" is supplied as an input on line 301 to sense mark test logic 288.

Note that if a "false" sense mark of different mark interval, e.g., a scratch or smudge on the web surface 17, were received at filter 310 and past the verification test for N clock pulses, the counter 294 would be enabled via mark sense logic 284. However, counting circuitry 286 would with high probability never score a hit since the mark sense interval would not roughly coincide with that for either a narrow or wide tracking mark.

Further, to insure a narrow initializing mark has, in fact, been sensed by counting circuitry 288, several sense marks are verified to have been observed before sense mark test logic 288 makes a final determination that a series of initializing marks have, in fact, been observed. This determination is accomplished with the aid of two bit counter 303.

The binary count of two is loaded into counter 303 from memory switch 305 at the start of this verification process. The loading of counter 303 is accomplished by an enablement on line 304 (LOAD). The initial enablement or LOAD of counter 303 is accomplished with handshaking from mark sense logic 284 wherein upon the receipt of what appears to an input from 311 of a mark sense interval, a signal on line 295 initializes sense mark test logic 288 which includes the loading of counter 303.

When sense mark test logic 288 receives a "hit" on line 301, counter 303 will be decremented via line 306 by a count of one. Three "hits" in a row on line 301 will cause an overfill in counter 303 with the spill over placed on output borrow line 307 of counter 303. Thus, three hits means that three good representations of initializing marks 71 has occurred and that the beginning of a treatment is, indeed, intended and that observation and verification of a wider registration mark 72 is in order.

If three sense mark intervals do not occur in a row, sense mark test logic 288 will enable 2 bit counter 303 via line 304 to reload its content with the count of two from memory switch 305. If further mark sense intervals are not received on line 311 by mark sense logic 284, logic 284 will place a signal on line 295 to cause sense mark test logic 288 to reinitialize for further narrow mark verification. This reinitialization includes the reloading of counter 303.

Once three hits in a row have been determined, the indication of which appears on the borrow line 307 to logic 288, logic 288 will then provide a signal on output line 302 to gates 298 to connect the wide count value in memory switch 297 to appear on the gates 298. This value is an 8 bit count representative of a wide mark interval, i.e., the mark interval of a registration mark 72 or 74.

Memory selects 296 and 297, having selected values respectively for narrow and wide mark sense intervals, can be preselected to any desired number value.

Additional narrow width sense intervals will be continually received at this time, as there are usually more than three initializing marks 71 as illustrated in FIG. 5. Since counter 294 will is now be loaded with the wider sense mark value, a "hit" would not occur in counting circuitry 286 due to the large value difference in count comparison thereby marking it impossible to reach an all binary 1's or 0s value in the five most significant bits in register 300.

When a wider registration mark is observed and the approximate value of its mark interval is achieved when the five most significant bits in register indicate either all binary 0's or 1's, an output on line 301 will indicate that a "hit" has been made. Logic 288, having previously set output 302 high, will interpret the receipt of this "hit" as the first wide registration mark 77 from which a determination can be made as to the precise point for START TREATMENT at 79 (see FIG. 5). At this time, sense mark test logic 288 enables its output line 308 which is indicative of wide sense mark interval detection. This embodiment will enable treatment start point logic 290 to permit the initialization and functioning of other circuitry shown in FIGS. 13 and 14 to utilize the continually received sense mark data for determining stepper motor and correction adjustments to be made. The output on line 308 represents a tracking acquisition signal (TRK ACQ) input to the circuitry in FIGS. 12 and 13 which will be discussed later.

The enablement of logic 209 is responsible for several principle functions. This includes the initialization of the position servo drives as well as the counting of a predetermined number of wide registration marks 72 to determine the START TREATMENT point 79. Logic 290 has a counter and memory switch similar to counter 303 and memory switch 305 except that memory swtich in logic 290 is set to the number value "R", which is representative of the number of wide registration marks to the START TREATMENT point 79. When treatment start point logic 290 has received via line 308 from sense mark test logic 288 a sufficient number of detected mark sense intervals equal R registration mark sense intervals, logic 290 will enable the output line 60, START TREATMENT, to station 16. Treatment start point logic 290 also loads the X and X' sense mark inputs on lines 311 and 312, respectively, onto lines 315 and 316. These outputs, termed X MARK SIGNAL LOAD and X' MARK SIGNAL LOAD, are supplied as inputs to the circuitry shown in FIG. 14, which will be discussed later.

Reference is now made to FIG. 12 which shows in more detail the sensor interface and stepper control 106 of FIG. 3.

The sensor interface comprises control logic 320 that is conventional circuitry designed to interpret its inputs in a conventional manner to provide velocity via line 330 and direction indication via line 331 to conventional stepper motor drive circuitry 322. Logic 320 has two manual inputs. There are the manual command left and right inputs 324 and 325 which permit manual operation of stepper motor 205 whereby an operator is permitted to manually initialize the lateral translation and position of supply roll 20. Input 327 is the general logic clock input. Input 328 is a disenabling input provided by a mechanical limit switch on system 10 to prevent any operation of the supply roll stepper motor 205 when the supply roll 20 is not in postion or is being changed.

Input 308 is TRK ACQ from start treatment logic 282 of FIG. 11. This is an enablement input to control logic 320 to commence the sensing functions and relative to web position and lateral adjustment of supply roll 20 as explained in connection with FIG. 3.

The inputs 221 and 222 from the limit sensor device 216 mounted on frame 140 are also inputs to control logic 320.

As mentioned relative to FIG. 4, the optical edge sensor 225 produces a signal that is proportional to the amount of coverage of web 18 over the sensor detection surface as compared to the amount of coverage off of the web edge and exposed to light source 224. The proper edge position for web 18 can therefore be proportional to a predetermined voltage value on line 108 which can be set to the voltage value $V_{REF}$. The set value for $V_{REF}$ is compared with the voltage appearing on line 108 in comparator 332 which also includes comparator amplifier and Schmitt trigger. Comparator 332 functions in a similar manner as comparator 260 and circuit 262 in FIG. 9 by providing hysteresis operating effect which is representive of a "deadband" of operation for stepper motor 205 so that the motor will not be placed in a "chatter mode", i.e., alternately step one direction and then the other in a continuous manner. The output 326 of comparator 332, therefore, is a logic value of either are binary "0" or "1" indicative of the magnitude of the difference between sensor input 167 and $V_{REF}$ as well as whether the value for input 167 was higher or lower than the representative value for $V_{REF}$. These values are interpreted by control logic 320 in a conventional manner into drive pulses for motor drive circuitry 322, the value of which is proportional to the magnitude of offset from $V_{REF}$. Also, the amount of sensor coverage indicates which direction the motor drive circuitry 322 should drive motor 205. Logic 320 is conventional configured logic used for such optical sensor applications to determine direction and magnitude and comprises AND/OR gate logic and two flip flops to hold the state of various input signals and interpret the signal sequence. The stepper motor drive circuitry 322 is conventional and comprises a high current driver having a four phase output to operate the unipolar four phase stepper motor 205. The four phase output is necessary for direction control of motor 205.

As previously explained relative to description of FIG. 3, the limit sensor 216 provides for maximum limits of operation on motor 205 and provides a starting or initialized position for lateral roll translation above that achievable through line-of-site positions of the web translation via inputs 234 and 235. How this initialization is achieved for the initialization of web guide servo control 102 is the same as detailed in FIG. 13 relative to te operation of state sequencer 342 and initialization control logic 346, although this Figure is directed to implementations for the position controls 42 and 44.

Figure 13A:
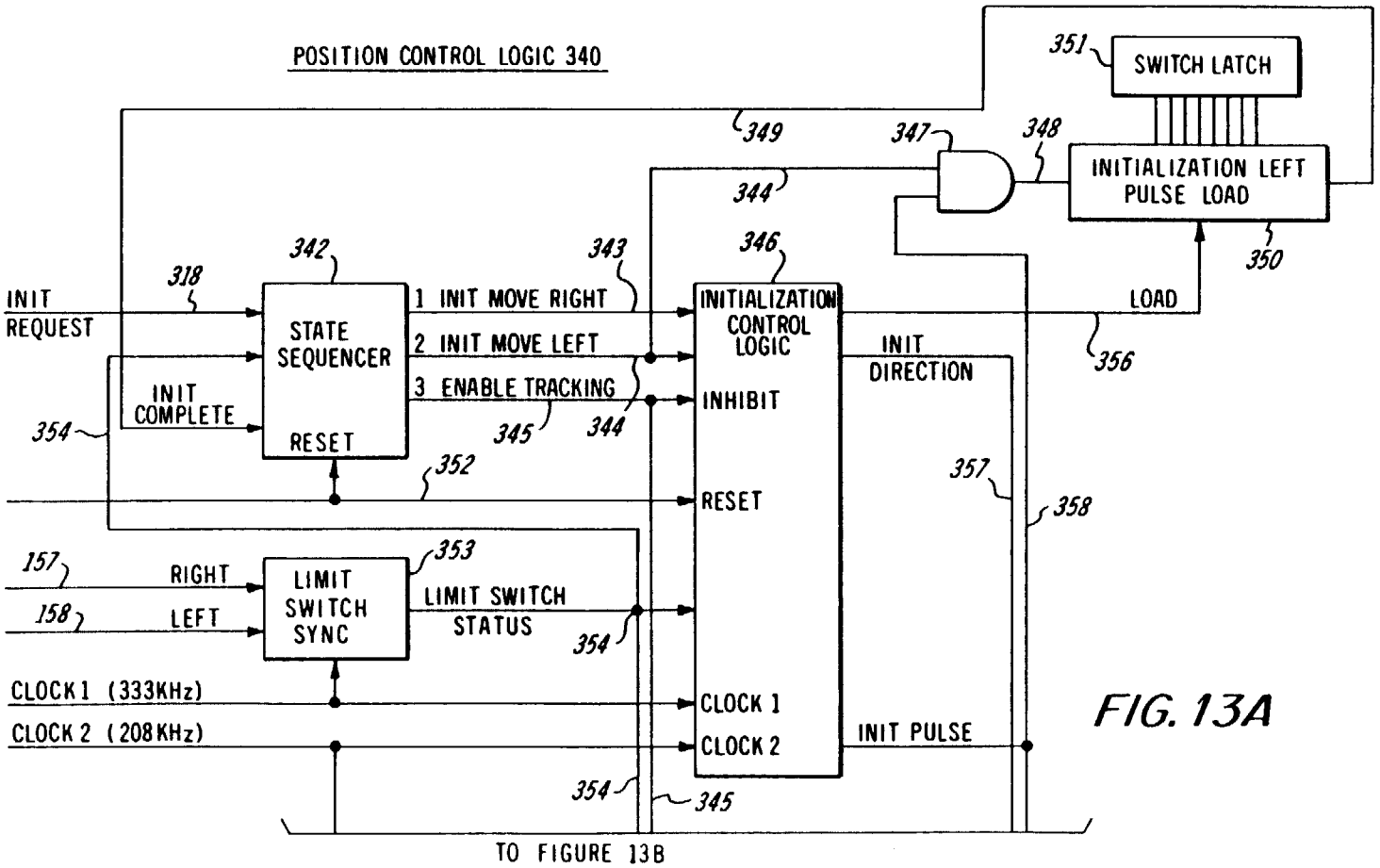
FIGS. 13A and 13B are circuit diagrams for any one of the position controls shown in FIG. 1 to provide stepped correction signals based upon tracking indicia information to a servo drive motor.
Figure 13B:
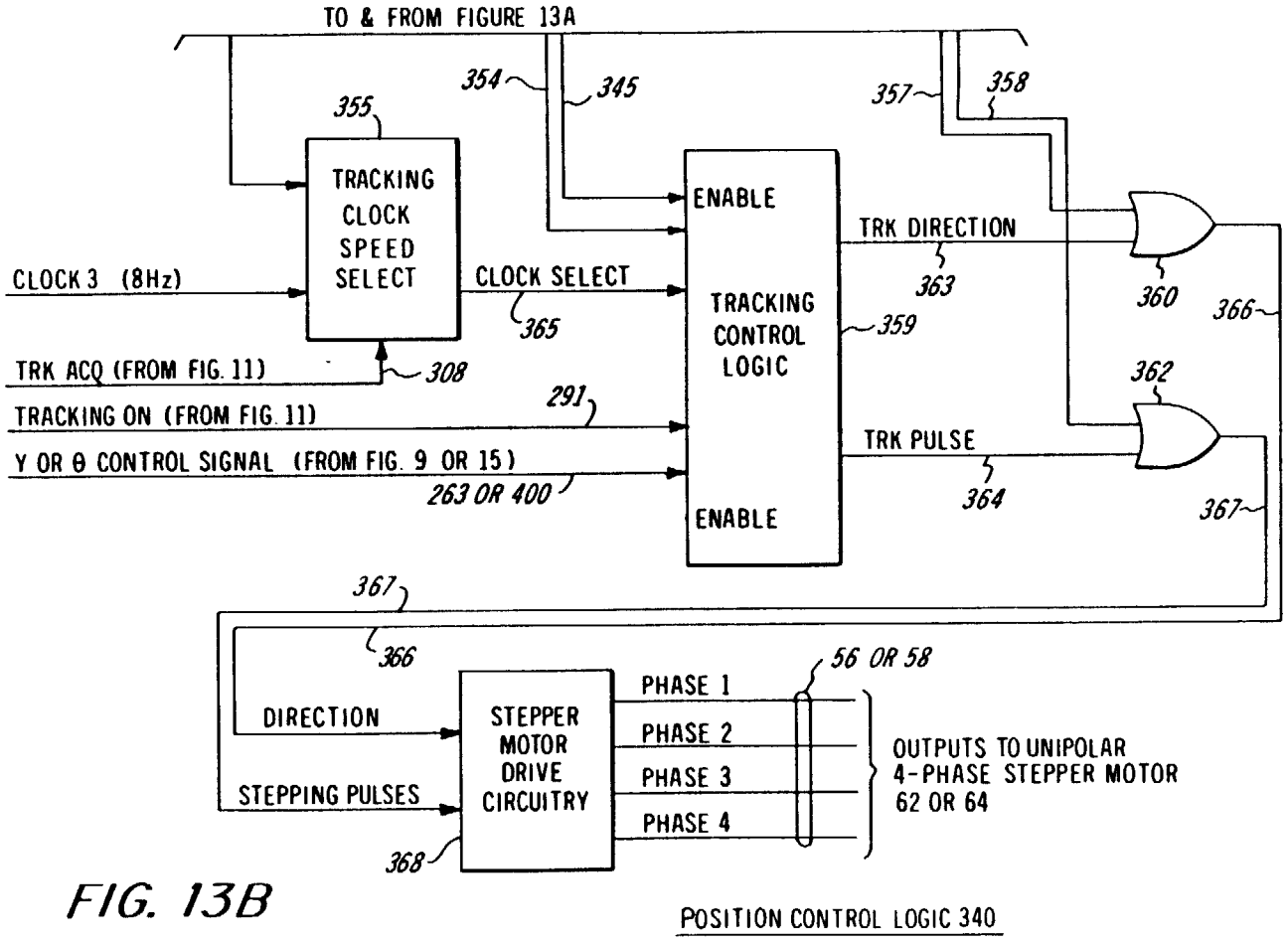

FIG. 13 is logic block diagram representative of the position control logic circuit 340 for use with either position control 42 or 44. The first function to occur is that a command for initialization request is received by the logic circuit 340 to initialize the position of the processing station 12 or 14 or a station component by initial stepper motor translation, for example to a desired central or neutral position. The INIT REQUEST is received by the state sequencer 342 in circuit 340. Sequencer 342 is a control that has three output states, INIT MOVE RIGHT, INIT MOVE LEFT and ENABLE TRACKING. These states are respectively outputs 343, 344 and 345 of sequencer 342. These outputs are also inputs to initialization control logic 346. Output 344 is also an input to an initialization left pulse counter 350 via AND gate 347 and input line 348 to counter 350. Counter 350 is connected to memory switch 351 which contains a predetermined number value for input to counter 35. The count value represents the initialized position desired for the selected position of initialized translation.

Sequencer output line 345, ENABLE TRACKING, is also an enabling input to tracking control logic 359.

State sequencer 342 and initialization control logic 346 are reset via line 352. Reset places sequencer back into its first state position for activation upon receipt of INIT REQUEST. Reset in logic 346 reloads counter 350 via LOAD line 356.

Another input to the initialization control logic 346 include limit switch status on line 354. Line 354 is also an input to state sequencer 342 and tracking control logic 359. The inputs 157 and 158 to limit switch sync 353 represent respectively maximum right and left limits of travel for the stepper motors 62 and 64.

Three different clocks are involved in the operation of position control circuitry 340. There is the main system clock 333 KHz or clock 1, a slower clock, clock 2 (208 Hz) and much slower clock 3 (8 Hz). Clocks 1 and 2 are inputs to initialization control logic 346. Clock 1 is also an input to limit switch sync 353. Clock 2 is also an input to tracking clock speed select circuit 355. Slow clock 3 is also an input to circuit 355.

The purpose of limit switch sync circuit 353 is to receive as an input on either line 157 or line 148 an indication that a maximum limit has been met at an appropriate limit switch sensor associated with either stepper motor 62 or 64, as the case may be. Circuit 353 merely syncs an incoming limit switch signal with the main system clock 1 to be in synchronization with the clocking of logic circuit 346. The indication of limit switch status is set on line 354 to initialization logic circuit 346 tracking control logic 359 and to state sequencer 342.

Initialization control logic circuit 346 has three outputs. The first output is a command signal, LOAD, on line 356 to cause counter 350 to load the number value from memory switch 351. The second output is an initializing INIT DIRECTION command on line 357 to an input of OR gate 360. The third output is an initializing INIT PULSES command on line 358 to an input of OR gate 362. The output on line 358 is also the other input of AND gate 347.

The outputs 363 and 364, TRK DIRECTION and TRK PULSE, of the tracking control logic circuit 359 are the other inputs to OR gates 360 and 362, respectively.

Tracking clock speed select circuit 355 also has, as an input, line 308 (TRK ACQ) from FIG. 11. As will be evident, this input provides an indication as to when either the clock 2 or clock 3 rate should be selected as an output on CLOCK SELECT line 365 to tracking control logic circuit 359.

Figure 14:
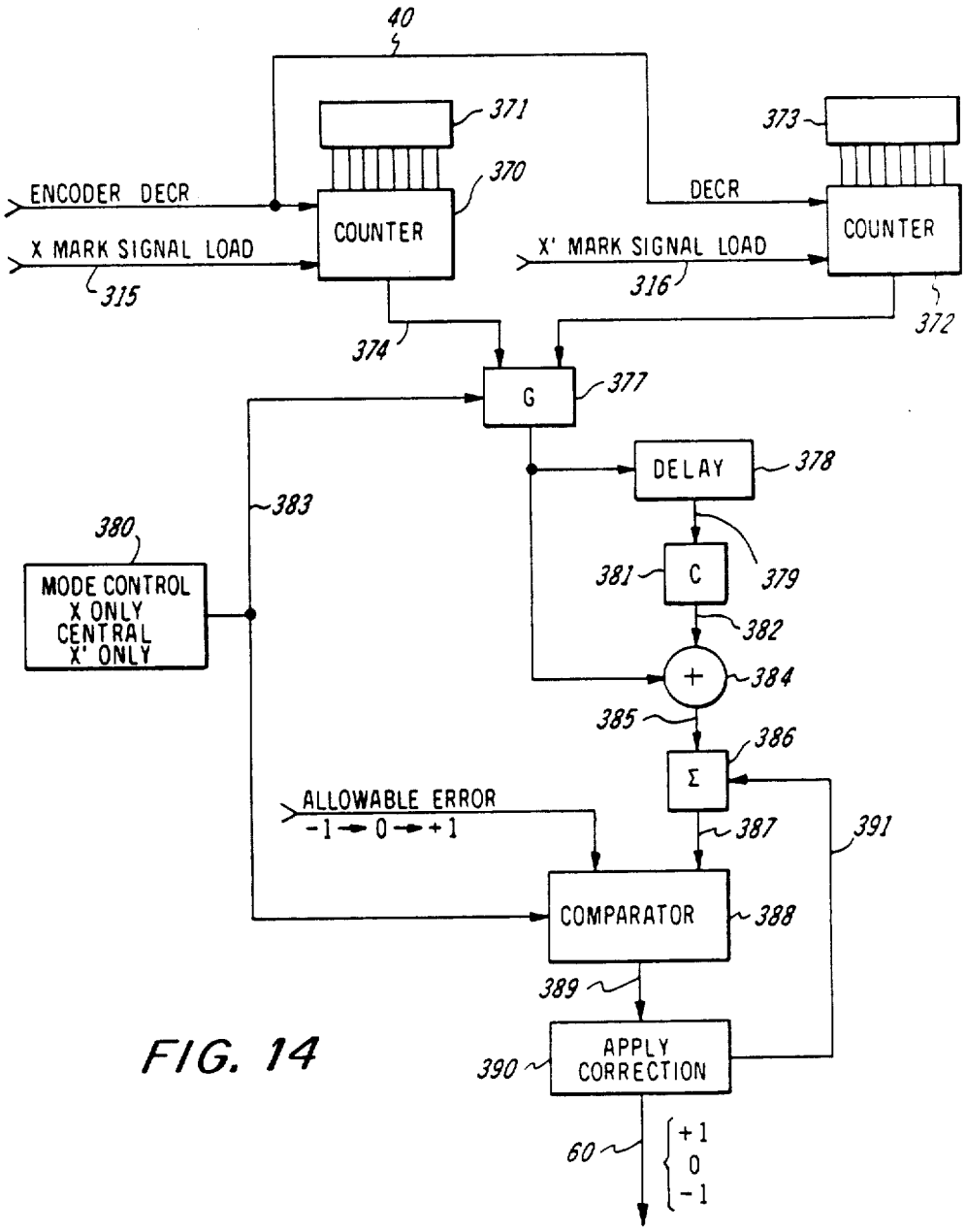
FIG. 14 is a circuit diagram for any one of the position controls shown in FIG. 1 to provide stepped correction signals based upon tracking indicia information that have been adjusted for signal noise.

The other inputs to logic circuit 359 are line 291 (TRACKING ON) from FIG. 11, or a control signal on line 263 from FIG. 9 or a control signal on line 400 from FIG. 14.

During initialization of the position of stepper drive motors 62 or 64, initialization control logic circuit 346 provides the INIT DIRECTION and INIT PULSES to the high current driver circuity 368 via lines 366 and 367 respectively from the outputs of OR gates 360 and 362. The output of circuitry 368 is, therefore, the four phase lines that are represented as line 56 or 58 in FIG. 1, as the case may be, to the stepper servo drive motors 62 and 64.

After initialization is complete, the function of initialization control logic circuit 346 terminates and the function of tracking control logic 359 becomes operational based upon the sensing conditions of the Y and Y' tracking of web tracking lines 76 and 78, for example, to provide tracking direction, TRK DIRECTION, on lines 363 and 366 and tracking pulses, TRK PULSE, on lines 364 and 367 to drive circuitry 368.

An explanation will now be given relative to the overall operation of the position control logic circuit 340.

Reset via line 352 has been accomplished. Reset causes initialization logic circuit to cause counter 350 to load in the number value contained in switch 351. Switch 351 may be selected to have any number that is representative of a close approximation as where the sensor X & Y; X' & Y' will be fairly aligned to the tracking indicia 70. Reset at sequencer 342 initializes its sequence so that the first operative output will be INIT MOVE RIGHT. Upon the receipt of an INIT REQUEST command at state sequencer 342, the sequencer enables output, INIT MOVE RIGHT on line 343. This command is to move the station or station comonent controlled by stepper motor 62 or 64 from its present position clear to its maximum right position allowable by its respective limit switch. Upon INIT MOVE RIGHT going high, logic circuit 346 provides a "right" INIT DIRECTION command on lines 357 and 366 to motor drive circuitry 368. Also, logic circuitry provides a continuous train of stepper pulses, INIT PULSES, on lines 358 and 367 to motor drive circuitry 368. Clock 2 clock rate is employed to the stepper INIT PULSES on line 358 to swiftly carry out this translation movement to the maximum right position.

Once the right position limit is reached, a limit switch signal via line 157 is received at limit switch sync circuit 353 which provides an indication to initialization logic circuit 346 via line 354 that the maximum limit has been achieved and the output on line 358 of INIT pulses at the clock 2 rate is terminated.

The receipt of this limit switch status at sequencer 342 provides a high on line 344, INIT MOVE LEFT. This output causes logic circuit 346 to issue INIT PULSES on line 358 at the clock 2 fast rate while providing an INIT DIRECTION indication on line 357 of move "left". The high on output 344 enables AND gate 347 and the pulses provided on line 358 are also supplied to counter 350. Counter 350 is decremented until the count equals zero at which time a signal high or INIT COMPLETE, is provided on output line 349 from counter 350 to state sequencer 342. This signal causes state sequencer 342 to place a high on output line 345 or ENABLE TRACKING. The effect of this high is to disenable initalization control logic circuit 346 and provide and enable to tracking control logic circuit 359, indicating that initialization of translational positioning to a preselected position has been accomplished and signals developed from regular tracking functions via photosensors X and Y can now be performed.

The last enablement input for tracking control logic circuit 359 is TRACKING ON on line 291 from the start treatment logic circuit 282 in FIG. 11. When this input is high, circuit 359 is enabled to receive Y tracking logic signals from the output of Y sensor interface circuit of FIG. 9 on line 263. These signals, as previously indicated, are either a logic "0" or "1" and indicative of a one step movement respectively either to the left or right dependent on the Y,Y' sensor relationship to tracking lines 76 and 78 as explained in connection with FIGS. 6–8.

It will be recalled that when TRACKING ON is enabled, the searching for the detection of narrow initializing marks 71 is enabled prior to the detection of a first wide registration mark 77. During this period of time, the output on line 308 or TRK ACQ is at a low. This causes tracking clock speed select circuit to select the faster clock rate, clock 2, for CLOCK SELECT line 365 to place tracking control logic circuit 359 in a high speed Y tracking mode. Thus, during START TREATMENT determination, THE RESPECTIVE position control 42 or 44 is actuated to swiftly permit step corrections to be applied by motor 62 or 64. As Y tracking logic signals are received at input line 263 to logic circuit 359, logic circuit 359 will issue a left or right direction command, TRK DIRECTION, on line 363 and a tracking pulse command, TRK PULSE, on line 364. The feeding of the tracking pulses will be at the clock 2 rate of the tracking pulses to the appropriate stepper motor 62 or 64. The incremental steps provided by the adjustment of stepper motors 62 and 64 may be, for example, as small as one tenth of a mil.

Once the start treatment logic circuit 282 of FIG. 11 has achieved a wide registration mark "hit" and enables output on line 308, TRK ACQ, will go high. This input high to tracking clock speed select circuit 352 will place the slow clock rate of clock 3 on its output line 365 to tracking control logic circuit 359 and place the tracking function into a low speed tracking mode.

Reference is now made to FIG. 14 which discloses detail relating to another embodiment for control 46 in FIG. 1. The X and X' MARK SIGNAL LOAD respectively on lines 315 and 316 from start treatment logic circuit 282 are inputs to the respective counters 370 and 372. Another input to each of the counters received at 370 and 372 is from encoder 36 via line 40 providing encoder pulses developed by the encoder working off the moving web 18. The encoder pulses decrement the respective counter 370 and 372. Counters 370 and 372 are loaded with a count value equal to M encoder pulses from their respective memory switches 371 and 373. As each X or X' MARK SIGNAL LOAD, representative of the end or beginning of a mark sense interval, is inputted to the respective counters 370 and 372 with the preloaded M value, the encoder pulses on line 40 decrement the counters until the next mark interval is received on their respective input lines 315 and 316. Any value remaining at the time of the next mark sense interval is placed on respective output lines 374 and 376.

As the X or X' sensor "see" the moving registation marks 72 and 74, a series of mark sense transitions are created via the circuit shown in FIG. 10. This is because each of these sensors include a sensor pair and a balance of either light or dark produced from the sensor pair will create a signal transition so that the output signals, X and X' MARK SIGNAL LOAD will have a cycle 240 (FIG. 6) that begins and ends between the spaced registration marks. The signal will have negative transitions in the middle of white spacings between marks and positive transitions in the middle of the dark marks. Thus, as the sensor pairs 1X and 2X, 1X' and 2X' see a balance in maximum or minimum illumination, the signal switches polarity. The series of pulses will, of course, depend upon the velocity of the web 18. As an example, the typical mark sense cycle or interval may be 0.16 inch and, therefore, 160 milliseconds period at a web velocity 1 inch per sec or a 1.6 second period at a web velocity at 0.1 inch per sec. The encoder on the other hand is capable of producing 2,000 pulses per revolution.

The counters 370 and 372 count the encoder pulses between negative transitions of mark sense intervals. It is a predetermined fact that there should be M encoder pulses per mark sense interval. Once the encoder pulses have been counted between mark sense intervals, the value M is subtracted from the count. Any difference, i.e., any encoder pulses remaining under the value of M or over the value of M represents error. This error represents the value for shrinkage or expansion of web 18. This error may be, for example, +1 or −1 or a larger value. This error is representative of X dimensional changes from center to center of the registration marks 72 or 74. By injecting correction pulses, such as, +1 or −1, on line 60 to station 16, correctional functions can be made at station 16 based upon dimensional changes in the X direction of the web, which changes can be accomplished on-the-fly.

It may be desirable that single increment corrections at a time of +1 or −1, which are equal to one encoder clock pulse, should be made on line 60 visa-vis several correction pulses, as this provides some damping and prevents potential over correction.

Experience has shown that typical changes in web material shrinkage and expansion comprising paper may be about 1 mil per foot of web length so that the amount of correction needed is very small.

The unfortunate fact about the LEFT ERROR and RIGHT ERROR output on the output lines 374 and 376 from counters 370 and 372 is that the sample values, representative of web error, are not [be] free from signal noise. As an actual example, assume the value for M happens to be 448 pulses. Thus, where there is no dimensional change in the web, there should be 448 encoder pulses between negative mark sense intervals. Experience has shown that out of 448 pulses, a difference of ±8 encoder pulses may represent signal noise and the expected error may be only ±0.02 of that value. This is a typical signal to noise value. The noise may be caused by several factors including the treatment processes applied to the web and the resolution or print clarity of the tracking indicia itself. Also, the X and X' sensors operate with some noise. The remaining portion of the circuit diagram in FIG. 14 is devoted to eliminating this error from the mark sense interval error values or samples on line 374 and 376.

As previously mentioned, the mark sense intervals are known to comprise M encoder pulses in the time frame intervals between the mark sense transitions derived from the optical sensor pairs 1X and 2X; 1X' and 2X'. If the web has stretched, there will be one or more encoder pulses above the value M between mark sense intervals. Conversely, if the web has shrunk, there will be one or more encoder pulses below the value M between mark sense intervals. These pulses above and below the value M may be termed samples. As indicated above, experience having shown that a major portion of the sample values is signal noise. The effect of this noise may be significantly removed by effectively averaging several samples together and making error corrections according to N samples comprising a sample group. This is mathematically accomplished by taking a running average over N samples wherein a current sample is added to the sample group and the oldest sample in the sample group is dropped out. One manner of mathamatically accomplishing this through logic circuitry is by taking each current sample group and effectively dividing by N, i.e., the number of samples in the group and then carry out a summation of these values in a summation circuit. The value in the summation circuit will be the total value of error for the mark sense intervals over a series of N samples.

Another manner of mathamatically accomplishing this through logic circuitry is illustrated in FIG. 14. As shown in FIG. 14, the samples on lines 374 and 376 are serially fed to delay 378 via gate 377 and line 379. Line 379 is also directly connected to summation circuit 384. Gate 377 is controlled by mode control 380 via line 383 which can permit the gate 377 to enable X ONLY samples, or X' ONLY samples or a combination of both X and X' samples (CENTRAL) to delay 378. Mode control 380 also provides the advantage of being able to select samples developed from one side of web 18 when a failure exists in the detection circuits at the other side of the web, e.g., light source failure depended upon by the X sensors. The utility or utilizing both X and X' sources for samples is taking into account more information relative to X dimensional changes although, the use of one such sample source has been found sufficiently adequate.

Delay 378 comprises a shift register which can contain N samples at a time. In this manner, the samples are delayed in time compared to the same samples on line 379. Before each cycle of operation, a current sample is loaded into delay 378 from line 379 and the last one is loaded out on line 379. The values on line 379 are then converted to their complement value at complement 381 and provided on line 382 as the second output to summation circuit 384. The value in circuit 384 represents the combined average running mean for the samples.

The bigger the sample group N, the more noise present in the samples may be effectively averaged out. However, sample groups too large will take longer to process the sample group and corrective action will be unreasonably delayed. The varying error over long web distance for which correction is needed may be not applied in proximity to the affected web section. If both the amount and the "polarity" of the error is changing, tracking web dimensional error with large sample groups of errors is not possible because the detected error and applied correction will come too late at station 16.

Somewhere between a small and large sample group is a range of optimized sample averaging. In the system disclosed in FIG. 14, N=16 was chosen. However, N=8 or 32 could also easily have been employed.

The combined average running mean in circuit 384 is then supplied on line 388 to a summation circuit 386. In circuit 386, the running mean produced in each cycle of operation of the delay 378 is added to a running total value. This total value is called the sum of the running mean.

The run output of circuit 386 is supplied on line 387 to comparator 388 wherein the sum of the running mean is compared with an allowable reference error. The allowable reference error represents an allowable error band, e.g., from $-1 \rightarrow 0 \rightarrow +1$. If the summed value from summing circuit 386 becomes equal to or greater than $\pm 1$, a correction command via line 389 is given at circuit 390. The action taken is that a correction pulse is issued on line 60 to processing station 16. At the same time, the total sum value in the summation circuit 386 is decremented by the same correction amount, i.e., the sum of the running mean is decremented each cycle by the value from correction circuit 390.

Line 383 from mode control 380 is also connected to comparator 388. If mode control 380 is set for X ONLY mode or X' ONLY mode, then the comparison value representative of the allowable reference error will be to set to N. If mode control 380 is set for CENTRAL mode, then the comparison value representative of the allowable reference error will be set to 2N since there are twice the samples involved in error correction.

Figure 15:
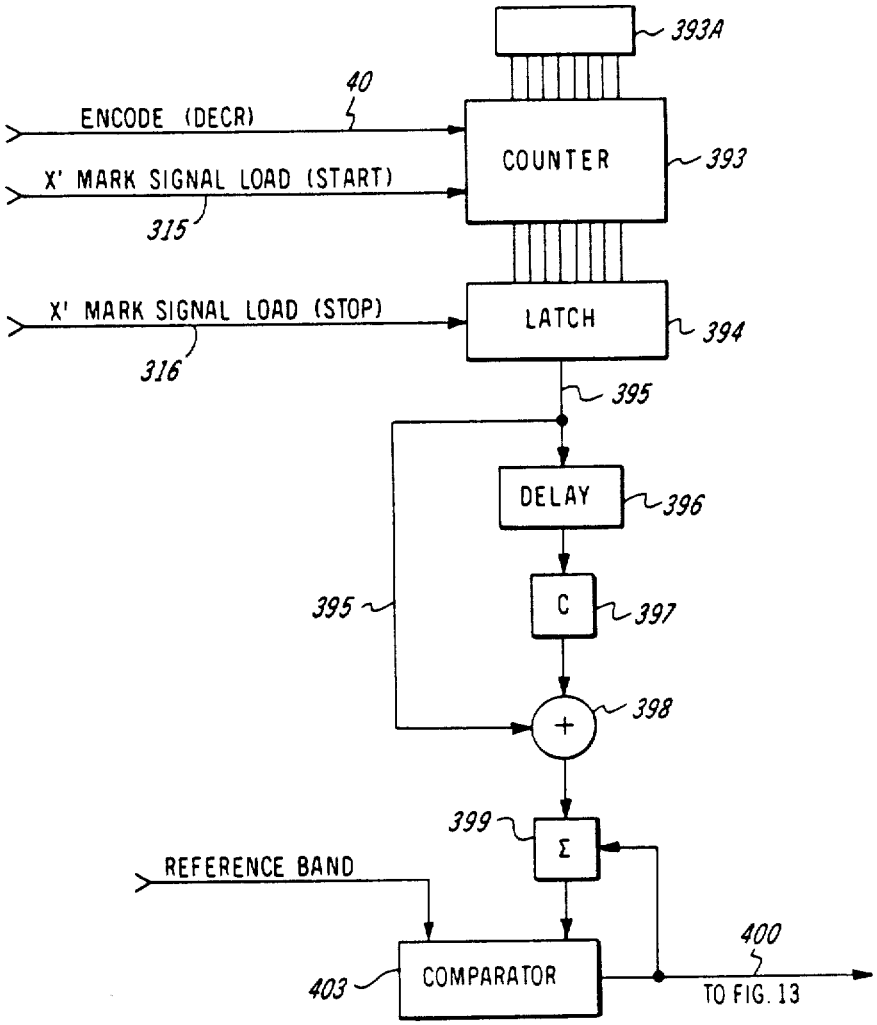
FIG. 15 is another circuit diagram for any one of the position controls shown in FIG. 1 to provide stepped correction signals based upon tracking indicia information that have been adjusted for signal noise.

In FIG. 15 discloses another circuit implementation control 42 or 44 in FIG. 1 for supplying control signals on line 400 to the position control logic circuit 340 in FIG. 13. This circuit implementation supplies correction signals for web skew in its path through system 10.

In FIG. 15, the X MARK SIGNAL LOAD on line 315 is supplied as a start signal for counter 393. Counter 393 is loaded with a count value equal to M encoder pulses from memory switch 393A. As each X MARK SIGNAL LOAD is inputted to counter 393, preloaded with the M value, the encoder pulses on line 40 decrement the counter. As soon as a signal, X' MARK SIGNAL LOAD, is received on line 316, the value in counter 393 is latched into register 394. This value then represents the phase difference between an incoming X mark sense interval and an incoming X' mark sense interval and represents an output line 395 the difference in distantial amounts on one side of the web as compared to the other and is indicative that the web is slightly skewed in its path through system 10.

These error values are fed into delay 396 which is the same as delay 378 in FIG. 14. A running average over N samples is examined per cycle wherein a current error sample is added to the sample group via line 395 into delay 396 and the oldest sample in the sample group is provided to the complement circuit 397. The delay complement signal and the original error signal are added by adder 398. The value here represents the combined average running mean. These values are added to a total value by summation circuit 399 which provides the sum of the running mean. This total summed value is compared to an allowable reference error, e.g., from $+1$ to $+1$, in comparator 403 to produce a logic signal on line 400 representative of a count value as measured in encoder pulses and determinative of whether X mark sense intervals are exceeding or diminishing relative to X' sense mark intervals.

FIG. 18 details an implementation for the tension servo control 98 of FIG. 1. The purpose of dancer roll 90 is *to* remove any loop that is [produce] *produced* in the web during its movement through system 10. Better control is maintained on web movement, particularly at higher velocities, keeping constant tension on the web and, also, provide for lower inertia. If movement of the web movement is primarily always at a slow velocity, the need for the dancer roll may be nonexistent.

Dancer roll 90 is pivotally supported for vertical movement on an arm 401 between two support rolls 402 and 404. Arm 401 is biased onto the surface of the web 18 by a preselected amount of force by compression spring 406. This force is indicated by arrow 161. Arm 401 has its pivot point connected to a movable commutator 408 of a reostat 410. Reostat 410 has linear resistance connected across a power source 412. As the tension and, thereof, the vertical elevation of dancer roll 90 varies vertically between rolls 402 and 404, commutator 408 will also move providing an analog output proportional to the movement of arm 401. This output on line 96 is supplied to a comparator 414 which may comprise the inverting input of a differential amplifier. The signal on line 412 is compared with a positive reference value, $V_R$ which is supplied to the noninverting input of comparator 414 via switch 416. The value $V_R$, represents the value of the preselected tension desired on the surface of web 18 by dancer roll 90. The compared output provided on line 418 is, therefore, representative of differences, either negative or positive, from the predetermined value. This output is supplied as an input to the motor driver circuit 420 for supply roll motor 19. Circuit 420 provides conventional motor drive circuitry for drive motor 19 but also includes a power amplifier which takes the signal on line 418 and increases or decreases the constant torque via line 100 on motor 19 represented by arrow 20' according to whether the compared deviation from the desired dancer roll tension is respectively too little or too much.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. Web tracking system for a continuous web of material which is transported from a supply roll means to a takeup roll means along a predetermined path via one or more sequentially positioned processing stations to treat said web comprising aligned tracking indicia comprising a line of registration marks of substantially uniform spacing and width along each edge of said web, means mounted relative to the passage of said web to optically observe said tracking indicia along each of said web edges as said web is transported along said path and produce informational tracking signals based upon the passage of said tracking indicia relative to said observation means, circuit means responsive to said informational signals to produce control signals indicative of changes in the lateral and longitudinal dimensions of said web, means to provide relative translation between said processing stations and said web along said path, said translation means responsive to said control signals to translate said processing stations according to changes in the lateral and longitudinal dimensions of said web.

2. The system of claim 1 wherein said translation means comprises web guide servo control to laterally translate a web supply roll at said supply means relative to said processing station.

3. The system of claim 1 wherein said translation means includes a processing station lateral position control to laterally postion said processing station relative to said web in said path.

4. The system of claim 1 wherein said translation means includes a processing station rotational position control to rotate said processing station relative to said web in said path.

5. The system of claim 1 wherein said tracking marks comprise registration marks of equal spacing and width.

6. The system of claim 5 wherein said registration marks are [preceeded] *preceded* by a plurality *of* aligned initializing marks at the beginning of said web, said initializing marks having a different geometric shape compared to said registration marks.

7. The system of claim 6 wherein said different geometric shape comprises a different mark width.

8. The system of claim 6 wherein the change from said initializing marks to said registration marks is indicative of a starting point for determining a particular location further along said web.

9. The system of claim 1 wherein determination of dimensional changes by said circuit means via said observation means is accomplished by monitoring the spacing between registration marks along at least one edge of said web indicative of changes in web length and monitoring lateral shift of said lines of registration marks relative to its respective observation means at both edges of said web indicative of either a change in web width or a lateral shift of said web relative to said observation means.

10. The system of claim 1 wherein said aligned tracking indicia comprises a line of registration marks of substantially uniform spacing and width along each edge of said web for purposes of monitoring dimensional changes in the length of said web and a solid line along each edge of said web ajacent to said line of registration marks for purposes of monitoring dimensional changes in the width of said web.

11. The system of claim 10 wherein determination of dimensional changes by said circuit means via said observation means is accomplished by monitoring the spacing between registration marks along at least one edge of said web indicative of changes in web length and monitoring lateral shift of said solid lines relative to its respective observation means at both edges of said web indicative of either a change in web width or a lateral shift of said web relative to said observation means.

12. Web tracking system for a continuous web of material which is transported from a supply roll means to a takeup roll means along a predetermined path via one or more sequentially positioned processing stations to treat said web comprising aligned tracking indicia along at least one edge of said web, said tracking indicia comprising a plurality of aligned of registration marks of substantially uniform spacing and width and a plurality of aligned initializing marks preceding said registration marks and having a different geometric shape compared to said registration marks, means mounted relative to the passage of said web to optically observe said tracking indicia as said web is transported along said path and produce [an] informational [signal ] *signals* indicative of [distant] *predetermined* lengths along said [medium] *web* useful at one or more of said processing stations, circuit means responsive to said informational [signal] *signals* indicative of the recognition of said initalizing marks and determinative of the point of transition from the last of said initializing marks to the first of said registration marks, said circuit means further determinative of the distance between said transition point and a predetermined point further along said registration marks wherein the treatment of said web is desired to be initiated relative to any one of said stations.

13. In the web tracking system of claim 12 wherein said initializing marks are identical to said registration marks but are of a different dimensional width.

14. In the web tracking system of claim 13 wherein said initializing marks are smaller dimensional width than said registration marks.

*15. The system of claim 1 wherein said circuit means comprises means for comparing said informational signals with a known value to produce said control signals representing a dimensional change in the lateral and longitudinal direction of the web,*

*means for averaging a plurality of said control signals together to produce a composite error signal representative of a running average in the lateral and longitudinal shrinkage or expansion of said web, and*

*means for utilizing said composite error signal to adjust the relative positional relationship of said web relative to one or more of said processing stations to compensate for any changes that have occurred in web lateral and longitudinal dimension.*

*16. The system of claim 1 wherein said circuit means comprises means to correct for misalignment between the lateral positional relationship of said web relative to at least one of said processing stations.*

*17. The system of claim 12 wherein said circuit means comprises means for comparing said informational signals with a known value to produce control signals representing a dimensional change in the lateral and longitudinal direction of the web,*

*means for averaging a plurality of said control signals together to produce a composite error signal representative of a running average in the longitudinal shrinkage or expansion of said web, and*

*means for utilizing said composite error signal to adjust the relative positional relationship of said web relative to one or more of said processing stations to compensate for any changes that have occurred in web longitudinal dimension.*

*18. The system of claim 17 wherein said utilizing means comprises means to correct for lateral misalignment between the lateral positional relationship of said web relative to at least one of said processing stations.*

*19. The system of claim 12 wherein there are aligned along at least two edges of said web, means to correct for lateral misalignment between (a) the lateral positional relationship of said web relative to one or more of said processing stations and (b) the lateral dimensional relationship of said web due to changes in the lateral shrinkage or expansion of said web relative to at least one of said processing stations.*

*20. The system of claim 12 wherein there is means to translation between at least one of said processing stations and said web along said path.*

*21. The system of claim 20 wherein said translation means comprises web guide servo control to laterally trans-*

*late said supply roll means relative to one or more of said processing stations.*

*22. The system of claim 20 wherein said translation means comprises a processing station lateral position control means to laterally position said processing station relative to said web in said path.*

*23. The system of claim 20 wherein said translation means comprises a processing station rotational position control to rotate said processing station relative to said web in said path.*

*24. The system of claim 12 wherein said tracking indicia comprise registration marks of substantially equal spacing and width.*

*25. The system of claim 12 wherein said different geometric shape comprises a different dimensional width.*

*26. A system for controlling the track or position of a continuous web of material traveling from a supply roll to a takeup roll along a predetermined path via one or more sequentially positioned processing stations for selectively treating a portion of the web comprising*

*aligned tracking indicia along at least one region of said web portion,*

*means mounted relative to the passage of said web to observe said tracking indicia as said web is transported along said path and produce informational tracking signals based upon the passage of said tracking indicia relative to said observations means,*

*circuit means for comparing said signals with a known value to produce error signals representing a dimensional change in the longitudinal direction of the web,*

*means for averaging a plurality of said error signals together to produce a composite error signal representative of a running average in longitudinal shrinkage or expansion of said web portion, and*

*means for utilizing said composite error signal to adjust the relative positional relationship of said web portion relative to one or more of said processing stations to compensate for any changes that have occurred in web longitudinal dimension.*

*27. The system of claim 26 wherein said utilizing means includes means to correct for lateral misalignment between the lateral positional relationship of said web portion relative to one or more of said processing stations.*

*28. The system of claim 26 wherein there are aligned tracking indicia along at least two regions of said web portion, said utilizing means including means to correct for lateral misalignment between (a) the lateral positional relationship of said web portion relative to one or more of said processing stations or (b) the lateral dimensional relationship of said web portion due to changes in the lateral shrinkage or expansion of said web portion relative to one or more of said processing stations.*

*29. The system of claim 26 wherein said utilizing means includes means to provide relative translation between at least one of said processing stations and said web portion along said path.*

*30. The system of claim 29 wherein said translation means comprises web guide servo control to laterally translate said supply roll relative to said processing station.*

*31. The system of claim 29 wherein said translation means comprises a processing station lateral position control means to laterally position said processing station relative to said web portion in said path.*

*32. The system of claim 29 wherein said translation means comprises a processing station rotational position control to rotate said processing station relative to said web portion in said path.*

*33. The system of claim 26 wherein said tracking indicia comprise registration marks of substantially equal spacing and width.*

*34. The system of claim 26 wherein said tracking indicia are preceded by initializing means indicative of a start point for processing of said web relative to any one of said processing stations and in conjunction with said utilizing means determinative of the distance between said start point and a predetermined point further along said tracking indicia wherein the treatment of said web is desired to be initiated relative to any one of said processing stations.*

*35. The system of claim 34 wherein said initializing means comprises at least one tracking indicia.*

*36. The system of claim 26 which includes*

*increment means to translate longitudinally, laterally or rotationally one or more of said processing stations or a component part of one or more of said processing stations,*

*said observation means including paired sensing means positioned relative to said tracking indicia, the outputs of corresponding pairs of said paired sensing means coupled to produce separate summed outputs comprising said information signals,*

*differences in magitude between said information signals indicative of the changes in said positional relationship.*

37. Web tracking system for a continuous web of material which is transported from a supply roll means to a takeup roll means along a predetermined path via one or more sequentially positioned processing stations to treat regional portions of said web and wherein a desired positional relationship is to be maintained between said web and one or more of said processing stations and comprising

*aligned tracking indicia continuous or closely spaced, intermittently continuous longitudinally along at least two regions of said web adjacent to said treated regional portions,*

*means mounted relative to the passage of said web to continuously observe said tracking indicia as said web is trasnported along said path and simultaneously produce on-the-fly informational signals based upon the passage of said tracking indicia relative to said observations means as said treated regional portions move into and through one or more of said processing stations,*

*means for utilizing said signals to correct on-the-fly for misalignment in the positional relationship of said web relative to at least one of said processing stations due to shrinkage or expansion changes in said web in either the lateral or longitudinal dimensions of said web or in both dimensions thereof.*

*38. The system of claim 37 wherein said circuit means comprises means for comparing said informational signals with a known value to produce said control signals representing a dimensional change in the longitudinal direction of the web,*

*means for averaging a plurality of said control signals together to produce a composite error signal representative of a running average in the longitudinal shrinkage or expansion of said web, and*

*means for utilizing said composite error signal to adjust the positional relationship of said web relative to one or more of said processing stations to compensate for said changes that have occurred in web longitudinal dimension.*

*39. The system of claim 37 wherein said utilizing means includes means to provide relative translation between at*

*least one of said processing stations and said web along said path.*

*40. The system of claim 39 wherein said translation means comprises web guide servo control to laterally translate said supply roll means relative to one or more of said processing stations.*

*41. The system of claim 39 wherein said translation means comprises a processing station lateral position control means to laterally position said processing station relative to said web in said path.*

*42. The system of claim 39 wherein said translation means comprises a processing station rotational position control to rotate said processing station relative to said web in said path.*

*43. The system of claim 37 wherein said tracking indicia are preceded by initializing means indicative of a start point for processing of said web relative to any one of said processing stations and in conjunction with said utilizing means determinative of the distance between said start point and a predetermined point further along said tracking indicia wherein the treatment of said web is desired to be initiated relative to any one of said processing stations.*

*44. The system of claim 43 wherein said initializing means comprises at least one tracking indicia.*

*45. The system of claim 37 which includes*

*increment means to translate longitudinally, laterally or rotationally one or more of said processing stations or a component part of one or more of said processing stations,*

*said observation means including paired sensing means positioned relative to each of said tracking indicia, the outputs of corresponding pairs of said paired sensing means coupled to produce separate summed outputs comprising said information signals,*

*differences in magnitude between said information signals indicative of the changes in said positional relationship.*

*46. Web tracking system for a continuous web of material transported from a supply roll means to a takeup roll means along a predetermined path via one or more sequentially positioned processing stations to treat said web wherein a desired positional relationship is to be maintained between said web and one or more of said stations and comprising*

*aligned tracking indicia along at least two regions of said web,*

*means mounted relative to the passage of said web to observe said tracking indicia as said web is transported along said path and produce informational signals based upon the passage of said tracking indicia and a web edge relative to said observations means,*

*means for utilizing said signals to correct for misalignment in the positional relationship of said web relative to at least one of said processing stations due to changes in the lateral positional relationship of said web relative to said processing station or due to shrinkage or expansion changes in said web in either the lateral and longitudinal dimensions of said web or in both dimensions thereof.*

*47. The system of claim 46 wherein said circuit means comprises means for comparing said informational signals with a known value to produce said control signals representing a dimensional change in the longitudinal direction of the web, pl means for averaging a plurality of said control signals produce a composite error signal representative of a running average in the longitudinal shrinkage or expansion of said web, and*

*means for utilizing said composite error signal to adjust the positional relationship of said web relative to one or more of said processing stations to compensate for said changes that have occurred in web longitudinal dimension.*

*48. The system of claim 46 wherein said utilizing means includes means to provide relative translation between at least one of said processing stations and said web along said path.*

*49. The system of claim 48 wherein said translation means comprises web guide servo control to laterally translate said supply roll means relative to one or more of said processing stations.*

*50. The system of claim 48 wherein said translation means comprises a processing station lateral position control means to laterally position said processing station relative to said web in said path.*

*51. The system of claim 48 wherein said translation means comprises a processing station rotational position control to rotate said processing station relative to said web in said path.*

*52. The system of claim 46 wherein said tracking indicia are preceded by initializing means indicative of a start point for processing of said web relative to any one of said processing stations and in conjunction with said utilizing means determinative of the distance between said start point and a predetermined point further along said tracking indicia wherein the treatment of said web is desired to be initiated relative to any one of said processing stations.*

*53. The system of claim 52 wherein said initializing means comprises at least one tracking indicia.*

*54. The system of claim 46 which includes*

*increment means to translate longitudinally, laterally or rotationally one or more of said processing stations or a component part of one or more of said processing stations,*

*said observation means including paired sensing means positioned relative to each of said tracking indicia, the outputs of corresponding pairs of said paired sensing means coupled to produce separate summed outputs comprising said information signals,*

*differences in magnitude between said information signals indicative of the changes in said positional relationship.*

*55. The system of claim 46 wherein said aligned tracking indicia are continuous or closely spaced, intermittently continuous indicia longitudinally along said at least two regions adjacent to regional portions of said web to be treated at said processing stations,*

*said mounted means to continuously observe said longitudinally continuous tracking indicia and simultaneously produce on-the-fly said information signals as said treated regional portions move into and thorugh one or more of said processing stations.*

*56. Web tracking system for a continuous web of material which is transported from a supply roll means to a takeup roll means along a predetermined path via one or more sequentially positioned processing stations to treat regional portions of said web and wherein a desired positional relationship is to be maintained between said web and one or more of said processing stations and comprising*

*aligned tracking indicia continuous or closely spaced, intermittently continuous longitudinally along at least one region of said web adjacent to said treated regional portions,*

*means mounted relative to the passage of said web to continuously observe said tracking indicia as said web is transported along said path and simultaneously*

*produce on-the-fly informational signals based upon the passage of said tracking indicia and a web edge relative to said observations means as said treated regional portions move into and through one or more of said processing stations,*

*means for utilizing said signals to correct on-the-fly for misalignment in the positional relationship of said web relative to at least one of said processing stations due to changes in the lateral positional relationship of said web relative to said processing station and due to shrinkage or expansion changes in said web in the longitudinal dimension of said web.*

*57. The system of claim 56 wherein said circuit means comprises means for comparing said informational signals with a known value to produce said control signals representing a dimensional change in the longitudinal direction of the web,*

*means for averaging a plurality of said control signals together to produce a composite error signal representative of a running average in the longitudinal shrinkage or expansion of said web, and*

*means for utilizing said composite error signal to adjust the positional relationship of said web relative to one or more of said processing stations to compensate for said changes that have occurred in web longitudinal dimension.*

*58. The system of claim 56 wherein said utilizing means includes means to provide relative translation between at least one of said processing stations and said web along said path.*

*59. The system of claim 58 wherein said translation means comprises web guide servo control to laterally translate said supply roll means relative to one or more of said processing stations.*

60. The system of claim 58 wherein said translation means comprises a processing station lateral position control means to laterally position said processing station relative to said web in said path.

*61. The system of claim 58 wherein said translation means comprises a processing station rotational position control to rotate said processing station relative to said web in said path.*

*62. The system of claim 56 wherein said tracking indicia are preceded by initializing means indicative of a start point for processing of said web relative to any one of said processing stations and in conjunction with said utilizing means determinative of the distance between said start point and a predetermined point further along said tracking indicia wherein the treatment of said web is desired to be initiated relative to any one of said processing stations.*

*63. The system of claim 62 wherein said initializing means comprises at least one tracking indicia.*

*64. The system of claim 56 which includes*

*increment means to translate longitudinally, laterally or rotationally one or more of said processing stations or a component part of one or more of said processing stations,*

*said observation means including paired sensing means positioned relative to said tracking indicia, the outputs of corresponding pairs of said paired sensing means coupled to produce separate summed outputs comprising said information signals,*

*differences in magnitude between said information signals indicative of the changes in said positional relationship.*

*65. Web tracking system for a continuous web of material which is transported from a supply roll means to a takeup roll means along a predetermined path via one or more sequentially positioned processing stations to treat said web wherein a desired positional relationship is to be maintained between said web and one or more of said stations and comprising aligned tracking indicia along at least two regions of said web,*

*means mounted relative to the passage of said web to observe said tracking indicia as said web is transported along said path and produce informational signals based upon the passage of said tracking indicia and a web edge relative to said observations means,*

*means for utilizing said signals to correct for misalignment in the positional relationship of said web relative to at least one of said processing stations due to changes in the lateral positional relationship of said web relative to said processing station or due to shrinkage or expansion changes in said web in the lateral dimension of said web or due to both of said changes.*

*66. The system of claim 65 wherein said circuit means comprises means for comparing said informational signals with a known value to produce said control signals representing a dimensional change in the longitudinal direction of the web,*

*means for averaging a plurality of said control signals together to produce a composite error signal representative of a running average in the longitudinal shrinkage or expansion of said web, and*

*means for utilizing said composite error signal to adjust the positional relationship of said web relative to one or more of said processing stations to compensate for said changes that have occurred in web longitudinal dimension.*

*67. The system of claim 65 wherein said utilizing means includes means to provide relative translation between at least one of said processing stations and said web along said path.*

*68. The system of claim 67 wherein said translation means comprises web guide servo control to laterally translate said supply roll means relative to one or more of said processing stations.*

*69. The system of claim 67 wherein said translation means comprises a processing station lateral position control means to laterally position said processing station relative to said web in said path.*

*70. The system of claim 67 wherein said translation means comprises a processing station rotational position control to rotate said processing station relative to said web in said path.*

*71. The system of claim 65 wherein said tracking indicia are preceded by initializing means indicative of a start point for processing of said web relative to any one of said processing stations and in conjunction with said utilizing means determinative of the distance between said start point and a predetermined point further along said tracking indicia wherein the treatment of said web is desired to be initiated relative to any one of said processing stations.*

*72. The system of claim 71 wherein said initializing at least one tracking indicia.*

*73. The system of claim 65 which includes*

*increment means to translate longitudinally, laterally or rotationally one or more of said processing stations or a component part of of one or more of said processing stations,*

*said observation means including paired sensing means positioned relative to each of said tracking indicia, the outputs of corresponding pairs of said paired sensing means coupled to produce separate summed outputs comprising said information signals, differences in*

*magnitude between said information signals indicative of the changes in said positional relationship.*

*74. The system of claim 65 wherein said aligned tracking indicia are continuous or closely spaced, intermittently continuous indicia longitudinally along said at least two regions adjacent to regional portions of said web to be treated at said processing stations,*

*said mounted means to continuously observe said longitudinally continuous tracking indicia and simultaneously produce on-the-fly said informational signals as said treated regional portions move into and through one or more of said processing stations.*

*75. Web tracking system for a continuous web of material transported from a supply roll means to a takeup roll means along a predetermined path via one or more sequentially positioned processing stations to treat said web comprising*

*aligned tracking indicia along at least one region of said web,*

*initializing means preceding said aligned tracking indicia,*

*means mounted relative to the passage of said web to optically observe said tracking indicia as said web is transported along said path and produce informational signals indicative of the longitudinal dimension along said web useful at one or more of said processing stations,*

*circuit means responsive to said informational signals indicative of the recognition of said initializing means and determinative of the point of transition from said initializing means to said tracking indicia, said circuit means further determinative of the distance between said transition point and a predetermined point further along said tracking indicia wherein the treatment of said web is desired to be initiated relative to any one of said stations.*

*76. The system of claim 75 wherein said initializing at least one registration mark on said web.*

*77. The system of claim 75 which includes*

*paired sensing means positioned relative to said tracking indicia, the outputs of corresponding pairs of said paired sensing means coupled to produce separate summed outputs comprising said information signals,*

*differences in magnitude between said information signals indicative of said point of transition.*

* * * * *